United States Patent [19]

Nguyen

[11] Patent Number: 5,844,826

[45] Date of Patent: Dec. 1, 1998

[54] LEADING ZERO COUNT CIRCUIT

[75] Inventor: Ted Nguyen, Saratoga, Calif.

[73] Assignee: Samsung Electronics Co., Ltd., Rep. of Korea

[21] Appl. No.: 730,922

[22] Filed: Oct. 18, 1996

[51] Int. Cl.⁶ .............................. G06F 7/00; G06F 7/38
[52] U.S. Cl. ...................... 364/715.1; 364/749
[58] Field of Search .................. 364/715.011, 715.04, 364/715.1, 748.01, 749

[56] References Cited

U.S. PATENT DOCUMENTS

| | | | |
|---|---|---|---|
| 4,247,891 | 1/1981 | Flynn et al. | 364/200 |
| 4,926,369 | 5/1990 | Hokenek et al. | 364/748 |
| 5,040,138 | 8/1991 | Maher, III | 364/748 |
| 5,111,415 | 5/1992 | Shackleford | 364/715.04 |
| 5,204,825 | 4/1993 | Ng | 364/715.04 |
| 5,241,490 | 8/1993 | Poon | 364/715.04 |
| 5,276,635 | 1/1994 | Naini et al. | 364/787 |
| 5,392,228 | 2/1995 | Burgess et al. | 364/715.04 |
| 5,463,574 | 10/1995 | Desrosiers et al. | 364/748 |
| 5,493,520 | 2/1996 | Schmookler et al. | 364/715.1 |

OTHER PUBLICATIONS

Erdem Hokenek et al., "Second–Generation RISC Floating Point With Multiply–Add Fused," IEEE Journal of Solid--State Circuits, vol. 25, No. 5, Oct. 1990, pp. 1207–1212.

Arpad Barna and Dan I Porat, "Arithmetic Circuits," Integrated Circuits in Digital Electronics, A Wiley–Interscience Publication, John Wiley & Sons, pp. 236–248. 1973.

*Primary Examiner*—Chuong Dinh Ngo
*Attorney, Agent, or Firm*—Skjerven, Morrill, MacPherson, Franklin & Friel LLP; Brian D. Ogonowsky

[57] ABSTRACT

A leading zero counter or anticipator is described herein which uses a 36-bit-wide bus. The bus can handle four 8 or 9-bit words, two 16-bit words, or one 32-bit word. The leading zero counter has an encoder section, a logic section, and a multiplexer section. Four encoders each receive a separate group of bits. A logic circuit receives the encoded signals and generates the leading zero count(s) for the binary number(s) on the 36-bit bus. The logic circuit is able to simultaneously generate four leading zero counts if the word size is 8 or 9 bits, two leading zero counts if the word size is 16 bits, or one leading zero count if the word size is 32 bits. A multiplexer connected between the logic circuit and a 36-bit output bus receives a control signal that indicates the word size of either 8, 9, 16, or 32 bits and applies the appropriate leading zero counts from the logic circuit to the appropriate bit positions on the output bus.

7 Claims, 27 Drawing Sheets

LEADING ZERO COUNT
BIT POSITIONS

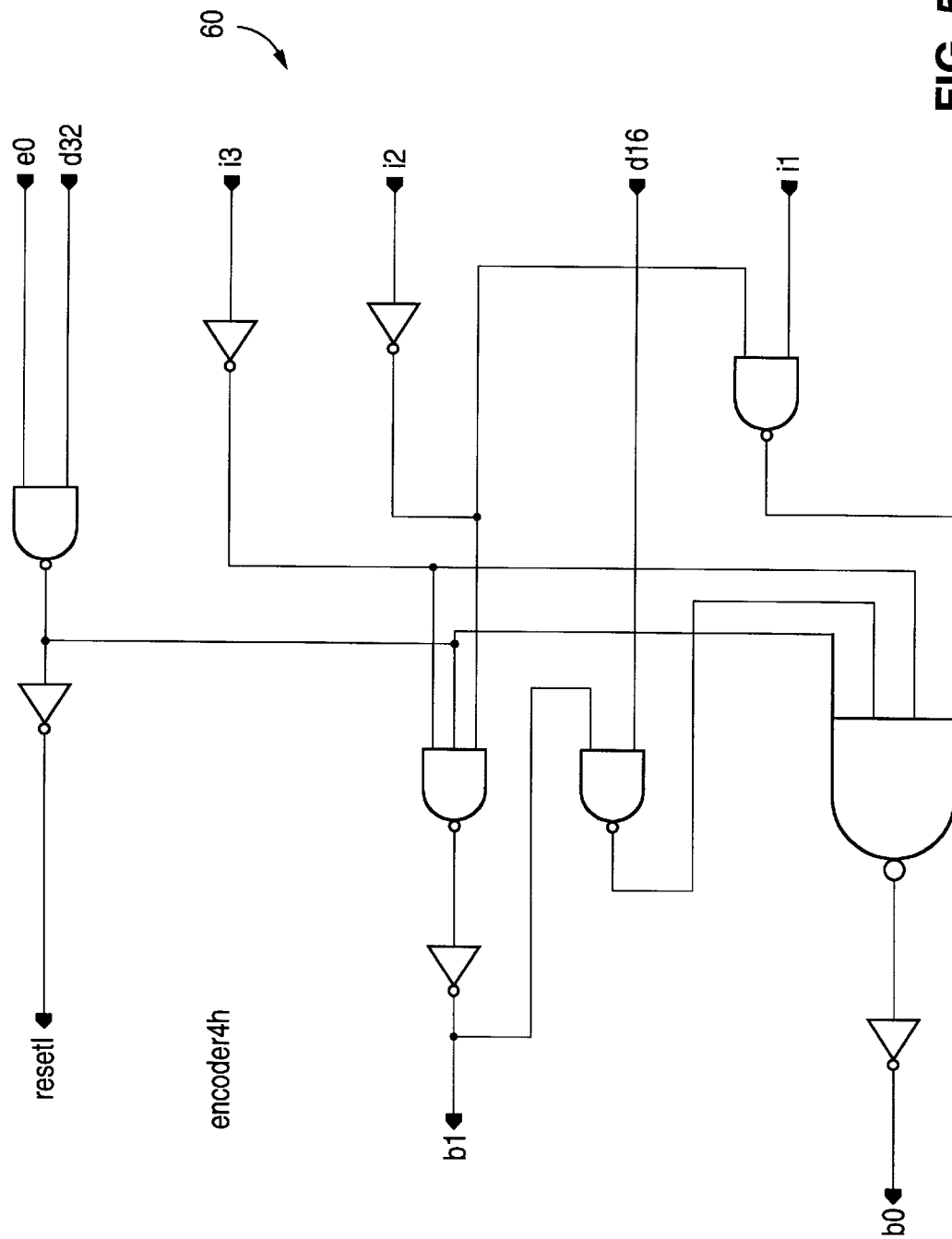

5,844,826

LEADING ZERO COUNT CIRCUIT

FIELD OF THE INVENTION

This invention relates to arithmetic processing circuits and, in particular, to a circuit which identifies and counts the leading zeros in a binary word.

BACKGROUND OF THE INVENTION

Arithmetic processing circuitry for binary numbers typically employs floating point arithmetic in accordance with an IEEE standard. Floating point arithmetic, used in addition, multiplication, and division, first normalizes the binary numbers to be added, multiplied, or divided by shifting the binary numbers until the first non-zero digit (i.e., 1) is immediately to the left of the radix point such that the mantissa part of binary numbers will be greater than or equal to 1 and less than 2. For multiplication, the normalized binary numbers are then multiplied and their exponents added. For division, the normalized binary numbers are divided and their exponents subtracted.

To normalize a binary number, the number of leading zeros (i.e., the number of zeros to the left of the first 1 in the binary number) must be quickly determined so that the number of shifts of the binary number can be quickly performed. Floating point multiplication and division calculations are typically reiterative and, thus, for a single multiplication or division calculation, the leading zeros at each step in the reiterative process must be calculated. Hence, any delays in counting these leading zeros are accumulated many times during a single multiplication or division calculation.

If the floating point arithmetic circuit is incorporated in a processor intended for use with a variety of word sizes, the leading zero counter or anticipator must also be adaptable for use with a variety of word sizes. Typical word sizes are 8 bits (byte), 9 bits for certain video applications, 16 bits (one-half word), and 32 bits (full word).

What is needed is a very fast circuit for calculating the number of leading zeros in a binary word of various sizes for use in performing a floating point arithmetic operation.

SUMMARY

A leading zero counter or anticipator is described herein which uses a 36-bit wide bus. The bus can handle four 8 or 9-bit words, two 16-bit words, or one 32-bit word. Four encoders each receive a separate group of 8 bits on the 36-bit bus. The remaining four bits, for use when 9-bit words are used, are routed around the encoders.

A logic circuit receives the encoded signals and the four additional bits (when 9-bit words are used) and receives signals which identity whether the binary number(s) on the bus are 8 bits, 9 bits, 16 bits, or 32 bits wide. In response, the logic circuit generates the leading zero count(s) for the binary number(s) on the 36-bit bus. Accordingly, the logic circuit is able to simultaneously generate four leading zero counts if the word size is 8 or 9 bits, two leading zero counts if the word size is 16 bits, or one leading zero count if the word size is 32 bits.

A multiplexer connected between the logic circuit and a 36-bit output bus receives a control signal that indicates the word size of either 8, 9, 16, or 32 bits and applies the appropriate leading zero counts from the logic circuit to the appropriate bit positions on the output bus. Accordingly, the output bus contains either four counts for an 8 or 9-bit word size, two counts for a 16-bit word size, or one count for a 32-bit word size.

The resulting leading zero counter is extremely fast and flexible. The count on the output bus may be used by a normalizer for shifting binary numbers to normalize the numbers in accordance with the IEEE standard for floating point arithmetic.

Another type of leading zero counter is also described which calculates the leading zeros of a binary sum of two numbers in parallel with the calculation of the sum. In this embodiment, a carry look-ahead (CLA) adder tree generates, from the two numbers to be added, carry (g), propagate (p), and zero (z) bits, as well as other intermediate bits whose significance would be well known to those skilled in the art of adders. Using the outputted signals from this carry tree, the number of leading zeros in a resulting sum are calculated using logic circuits. In parallel with this operation of generating the leading zero count, a separate adder (using a CLA tree and conventional adder technology) calculates the sum. Hence, the actual sum and the leading zeros are calculated in parallel so that no additional time is incurred in counting the zeros. The resulting leading zero count may then be used for shifting the sum in order to normalize the sum for a subsequent arithmetic operation.

In the preferred embodiment, the leading zero counter is formed on a monolithic silicon chip along with floating point arithmetic processing circuitry and other circuitry to create a multimedia signal processor.

BRIEF DESCRIPTION OF THE DRAWINGS

FIGS. 5A–5F illustrate the circuitry of FIGS. 4A–4C in greater detail.

DETAILED DESCRIPTION OF THE PREFERRED EMBODIMENTS

Description of Leading Zero Counter For Parallel Words On An Input Bus

Figure 1:
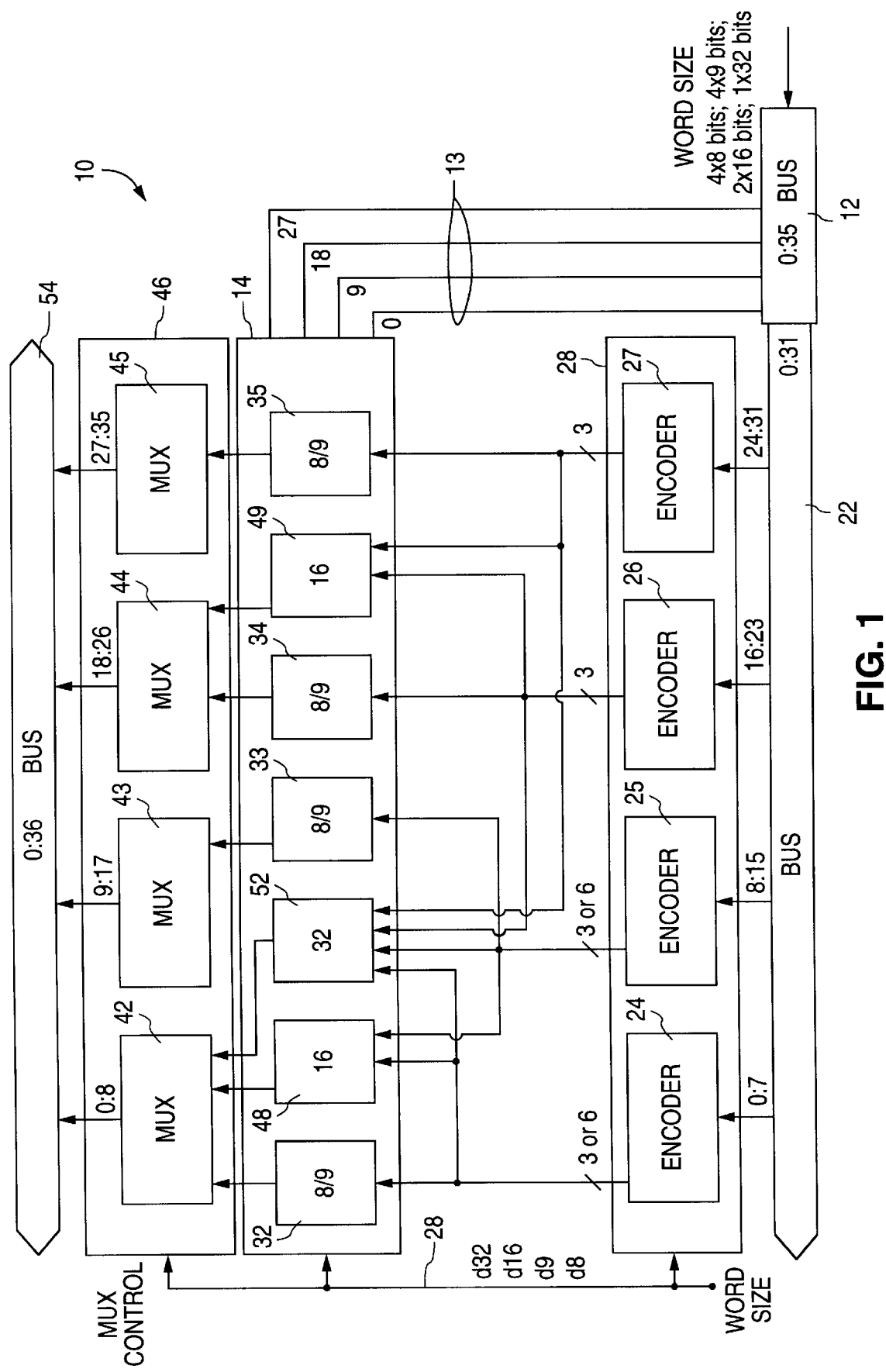
FIG. 1 s a block diagram illustrating the preferred embodiment of the leading zero counter having the flexibility to count leading zeros for 8-bit, 9-bit, 16-bit, or 32-bit word sizes.

FIG. 1 illustrates a leading zero counter 10 in accordance with the preferred embodiment of the invention.

In a preferred embodiment, the leading zero counter 10 is formed on a monolithic silicon chip containing a processor, a memory, and other circuitry for manipulating audio and video signals in a multimedia application. In order for the multimedia processor to be used in a variety of applications and in applications which employ a variety of word sizes, the multimedia processor is capable of processing data in any of the four word sizes 8, 9, 16, or 32 bits. The 9-bit word size is commonly used in video applications.

Multimedia processing is computationally extensive, and extremely high computing speeds are required in order to meet the requirements for motion video and three-dimensional graphics. Computations are typically performed using an IEEE floating point arithmetic standard, where the binary numbers involved in the calculations are first normalized by shifting the binary numbers to the left until the first 1 is to the left of the radix point. Hence, a circuit for quickly identifying the number of leading zeroes in a word plays an important role in a floating point arithmetic unit.

An input bus 12 contains 36 wires in parallel for transmitting in parallel either four 8-bit words, four 9-bit words, two 16-bit words, or one 32-bit word. The word size depends upon the particular application of the processing circuit containing the leading zero counter 10. Also, certain applications may find it advantageous to use a variety of word sizes. The leading zero counter 10 of FIG. 1 determines all the leading zero counts for the words on bus 12, whether the word size is 8 bits, 9 bits, 16 bits, or 32 bits.

Figure 2:
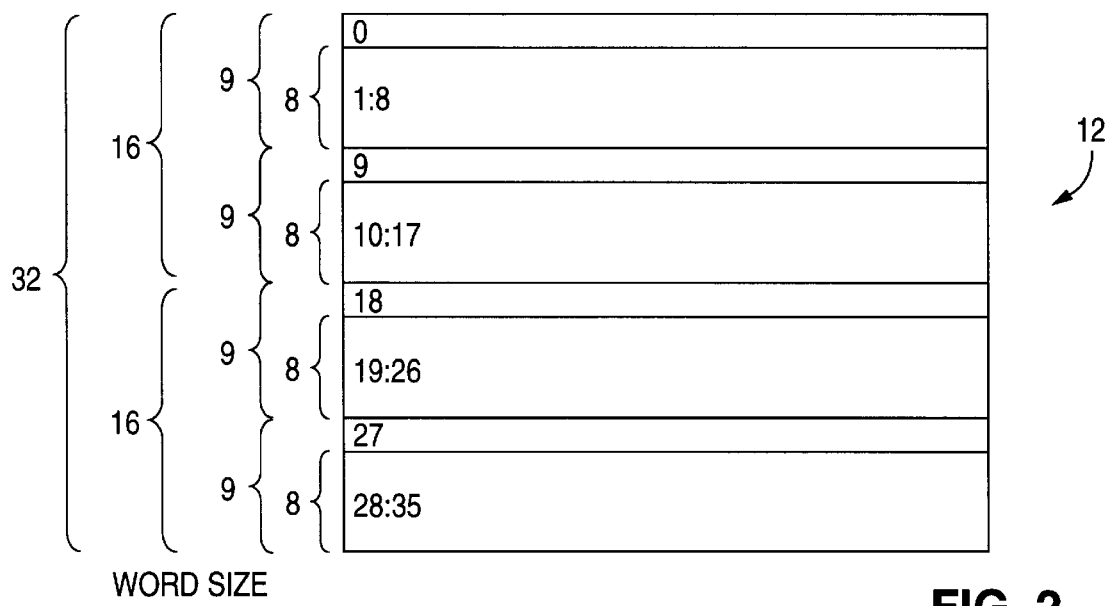
FIG. 2 illustrates the sectioning of the 36-bit input bus for the four different word sizes.

FIG. 2 illustrates the input bus 12, having 36 conductors (0:35) in parallel, showing how the 0:35 bit positions on the bus 12 carries either four 8-bit words, four 9-bit words, two 16-bit words, or one 32-bit word.

Referring back to FIG. 1, the conductors 13 in the input bus 12 at bit positions 0, 9, 18, and 27 are applied directly to a logic circuit 14 in the event that each word is 9 bits wide, to be described in greater detail with respect to FIG. 4. The remainder of the 32 bits on input bus 12 are connected to a 32-bit bus 22. Four 8-bit encoders 24, 25, 26, and 27 in an encoder section 28 each receive 8 bits on the 32-bit bus 22. The bit positions of these eight bits are identified at the inputs of each encoder 24–27.

One or more signals on wires 28 (on the left side of FIG. 1), identifying the current word size, are applied to encoders 24–27 and logic circuit 14. These signals identifying the word size are used in the preferred embodiment, since several of the leading zero counters in logic circuit 14 have dual functions. For example, several of the counters are used for either an 8-bit or 9-bit word, and one of the counters is used for either a 32 or 16 bit word, in order to conserve silicon area. In another embodiment, the various counters in logic circuit 14 do not need to perform dual functions, and applying the word size to the encoders 24–27 and the logic circuit 14 would be unnecessary.

The 8-bit signals applied to each encoder 24–27 are thus encoded to generate an encoded signal of fewer bits, such as three bits, to convey each 8-bit input. In the preferred embodiment, encoders 24 and 25 each also produce an additional 3-bit code which is applied to a leading zero counter for a 16 bit word at bit positions 0 to 15 on bus 22. However, such generation of additional bits is to reduce silicon area for the counters and is optional.

In one embodiment, logic circuit 14 contains seven counters. Counters 32, 33, 34, and 35 are connected to a respective 3-bit output of encoders 24, 25, 26, and 27 and to a respective one of the conductors 13 (for 9-bit words). If it is identified to counters 32–35, via wires 28, that the words applied to the input bus 12 are 8-bits wide, then counters 32–35 will count the leading zeroes for each 8-bit word encoded by encoders 24–27. If the signals on wires 28 indicate that each of the words are 9 bits, then each of counters 32–35 factor in the bits at bit positions 0, 9, 18, and 27 on conductors 13, shown on the right side of logic circuit 14, to calculate the leading zeroes for the 9-bit words. Thus, counters 32–35 act as leading zero counters for either an 8 bit word or a 9 bit word. Such a dual use of a counter conserves silicon area. An output of each of the counters 32–35 is coupled to a respective multiplexer 42, 43, 44, and 45 in multiplexer section 46, to be described in more detail later.

In another embodiment, a separate counter is used for the 8-bit words and the 9-bit words, and these counters are not combined as are counters 32–35.

Two 16-bit counters 48 and 49 are shown, where counter 48 receives the encoded signals from encoders 24 and 25, corresponding to bit positions 0 to 15 on bus 22, and counter 49 receives the encoded signals from encoders 26 and 27, corresponding to bits 16 to 31 on bus 22. Counters 48 and 49 thus convert the encoded signals into leading zero counts if the word length is 16 bits. These counts are applied to a respective one of multiplexers 42 and 44.

A counter 52 receives inputs from all four encoders 24–27 and converts the encoded data into a leading zero count for a 32-bit word. An output of counter 52 is applied to the input of multiplexer 42.

Each of the counters receives a signal on wires 28 identifying the current word size. This is used by the various counters, particularly those which have a dual function, to determine which group of input bits corresponds to a single word.

In the preferred embodiment, counters 52 and 49 are combined into a dual-function counter to reduce the silicon area. A signal on wires 28 indicating a word size of 32 bits or 16 bits is applied to the combined counter 52 and 49 to cause the combined counter to either count the leading zeroes in a 32-bit word or the leading zeroes in a 16-bit word at bit positions 16 to 31 on bus 22. Such detail will be shown later with respect to an actual embodiment of the invention in FIGS. 4A, and 4B, and 4C.

If separate counters were used for each word size, each of the counters may be active to concurrently generate a leading zero count for all possible word sizes. In the preferred embodiment, however, since many of the counters are used for two word sizes, counts for all possible word sizes are not generated concurrently. In another embodiment, only the counters associated with the selected word size are enabled to reduce power consumption.

Each multiplexer 42–45 outputs 9 bits. The word size is applied to a control terminal of each of multiplexers 42–45 to control each multiplexer to route the appropriate input to its output. The 9-bit output of each multiplexer 42–45 is applied to respective groups of nine conductors on a 36-bit output bus 54.

Figure 3:
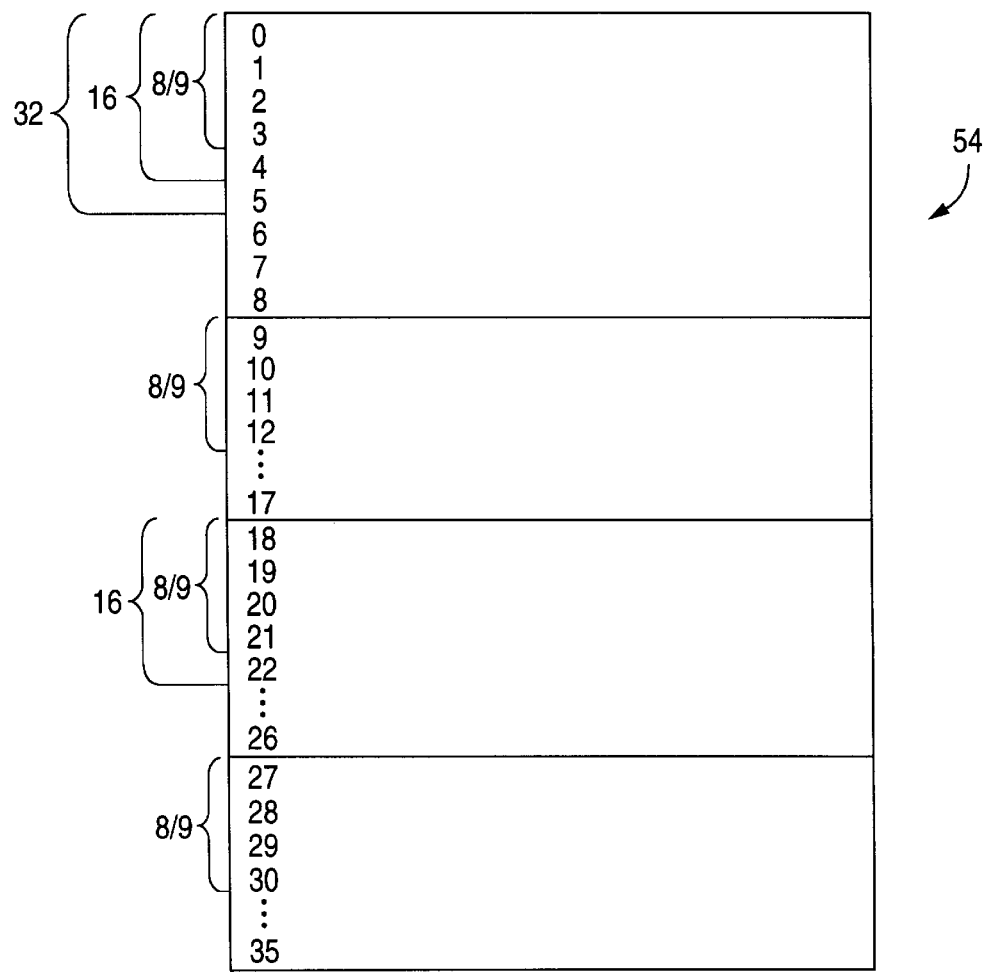
FIG. 3 illustrates the bit positions on the output bus used to convey the courts for the four different word sizes.

FIG. 3 illustrates the assignment of bit positions on output bus 54 for the leading zero counts for various word sizes. For a word size of 8 or 9 bits, the four leading zero counts on bus 54 for the four words are in bit positions 0:3, 9:12, 18:21, and 27:30. For 16-bit word sizes, the leading zero counts are in bit positions 0:4 and 18:22. For a 32-bit word, the leading zero count is found in bit positions 0:5. Conductors in output bus 54 which are not used to convey a leading zero count are, in one embodiment, pulled to ground.

The resulting leading zero counter 10 of FIG. 1 is extremely fast and highly flexible. The ability to designate word sizes allows the leading zero counter 10 to be used in floating point arithmetic unit for a variety of applications. The leading zero count is typically used to shift a binary number to the left by the zero count so that the first 1 is to the left of the radix point.

Figure 4A:
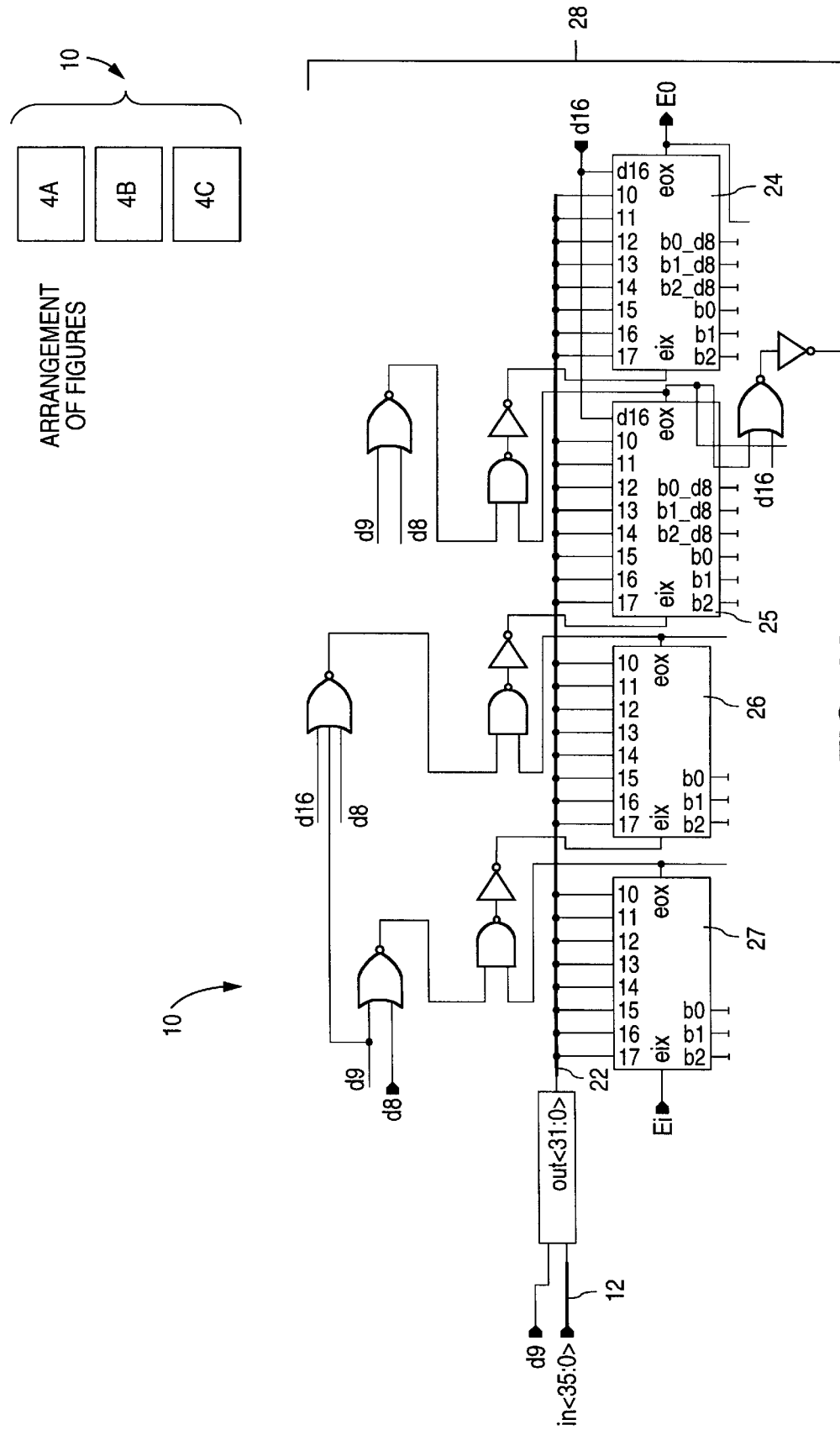
FIGS. 4A, 4B and 4C constitute a block and logic level diagram of an actual embodiment of the leading zero counter of FIG. 1.
Figure 4B:
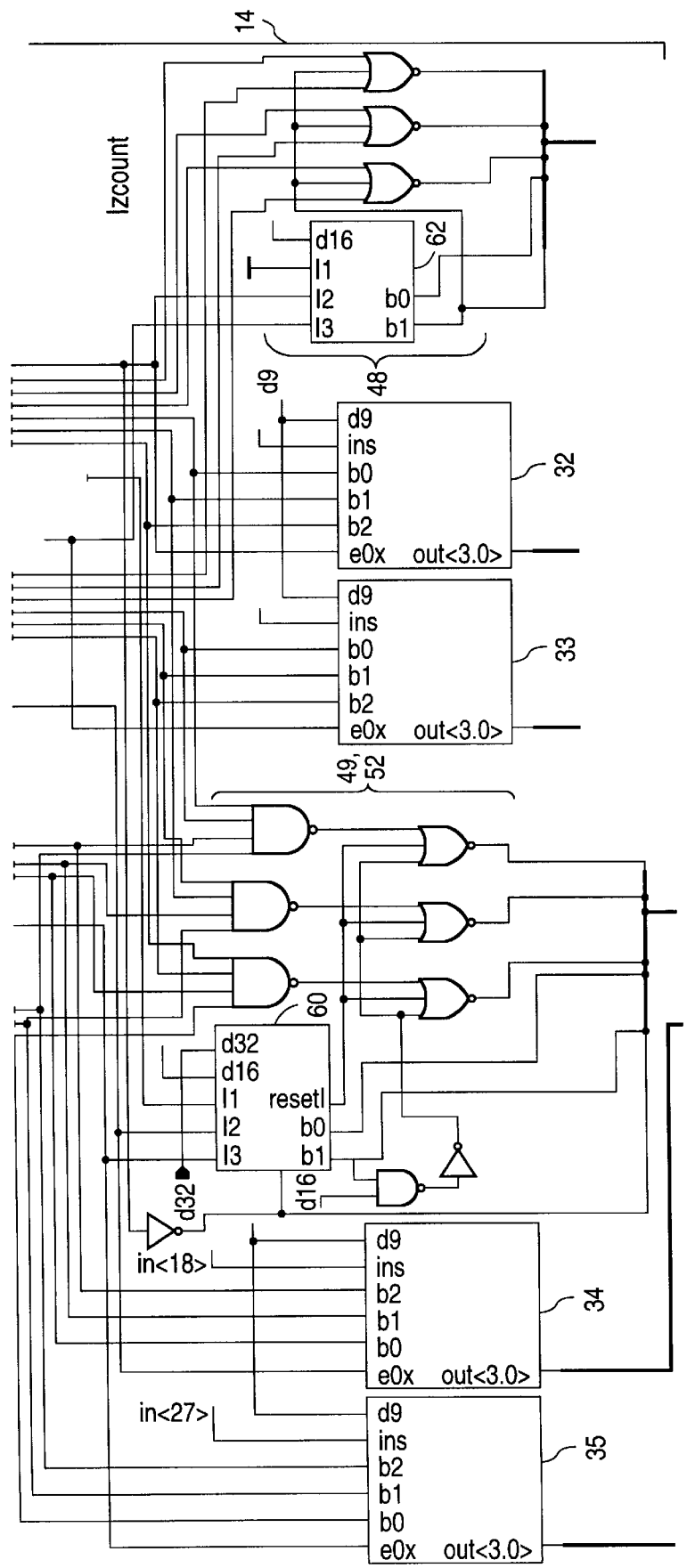
Figure 4C:
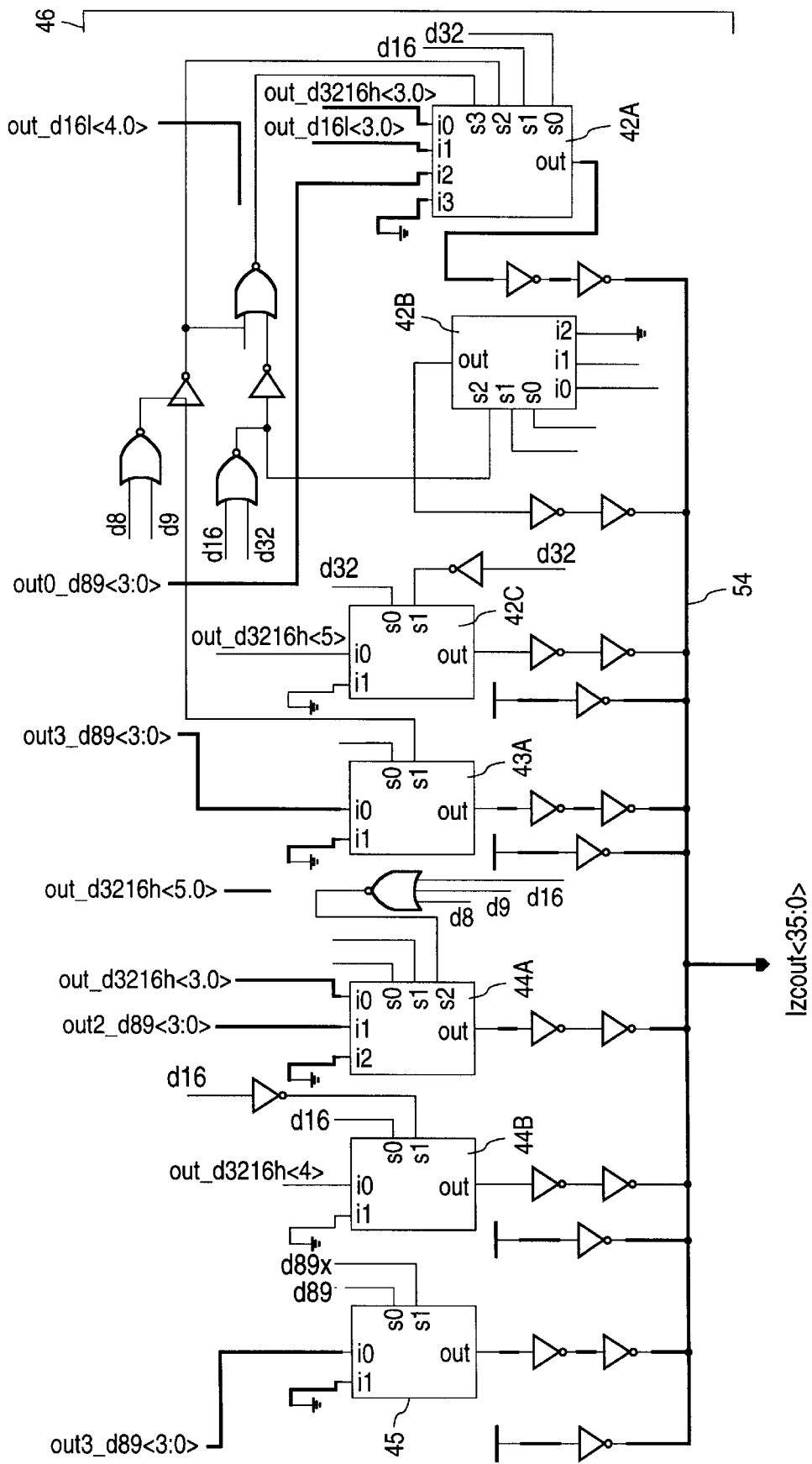

Conventional multiplexers, counters, and encoders may be used for the circuit of FIG. 1 in place of the unique circuitry described with respect to FIGS. 4A–4C.

An embodiment of the actual invention implemented in silicon and verified using simulation and testing is shown in FIGS. 4A, and 4B, and 4C. This diagram and its terminal identifications would be easily understood by those skilled in the art. The three main sections of the leading zero counter 10 are identified as the encoder section 28, the logic circuit 14 (which contains the counters), and the multiplexer section 46. The signal leads labelled d8, d9, d16, and d32 throughout FIGS. 4A–4C are each asserted depending upon the word size used. These four signals are shown on the left side of FIG. 1 as being on wires 28. The various encoders, counters, and multiplexers in FIGS. 1 and 4 which are identified with the same numerals may perform identical functions.

Each multiplexer 42–45 in the multiplexer section 46 is, in the preferred embodiment, actually formed of a number of multiplexers, each coupled to different bit positions in the output bus 54. For example, since the leading zero count for 8 and 9-bit words cannot exceed 4 bits (i.e., the maximum count can only be 8 or 9), the multiplexers 42A, 43A, 44A, and 45 associated with the leading zero counts for the four 8 and 9-bit words are only coupled to bit positions 0:3, 9:12, 18:21, and 27:30 on output bus 54. Similarly, the multiplexers 42A, 42B, 44A and 44B associated with the leading zero counts for the two 16-bit words are only coupled to bit positions 0:4 and 18:22 on output bus 54. The multiplexers 42A, 42B, and 42C associated with the leading zero count for a 32-bit word are only coupled to the first six bit positions 0:5 of output bus 54. By breaking up the multiplexers 42–45 in FIG. 1 into a greater number of more specialized multiplexers, the multiplexer section 46 is made extremely small and simple for high speed and highly efficient use of silicon area. Bit positions on output bus 54 which are never needed (e.g., bit positions 6:8, 13:17, 23:26, and 31:35) receive a permanent ground potential signal.

Figure 5A:
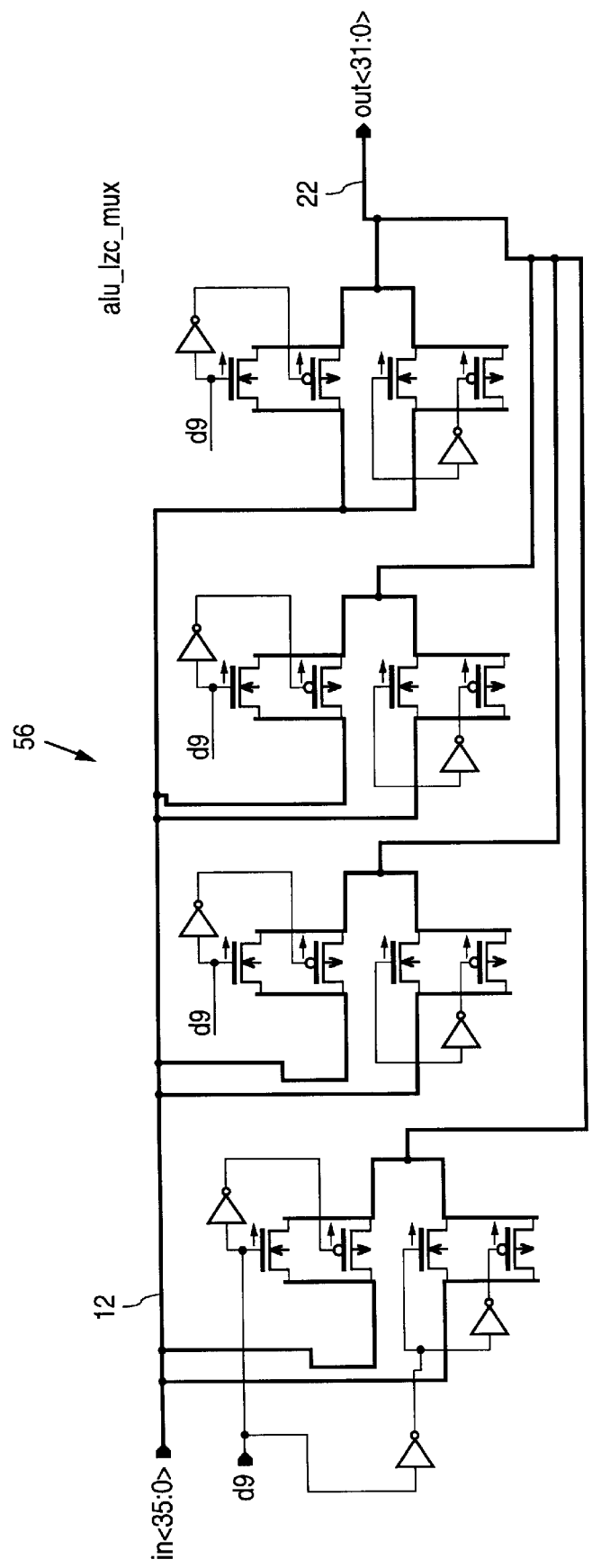
Figure 5B:
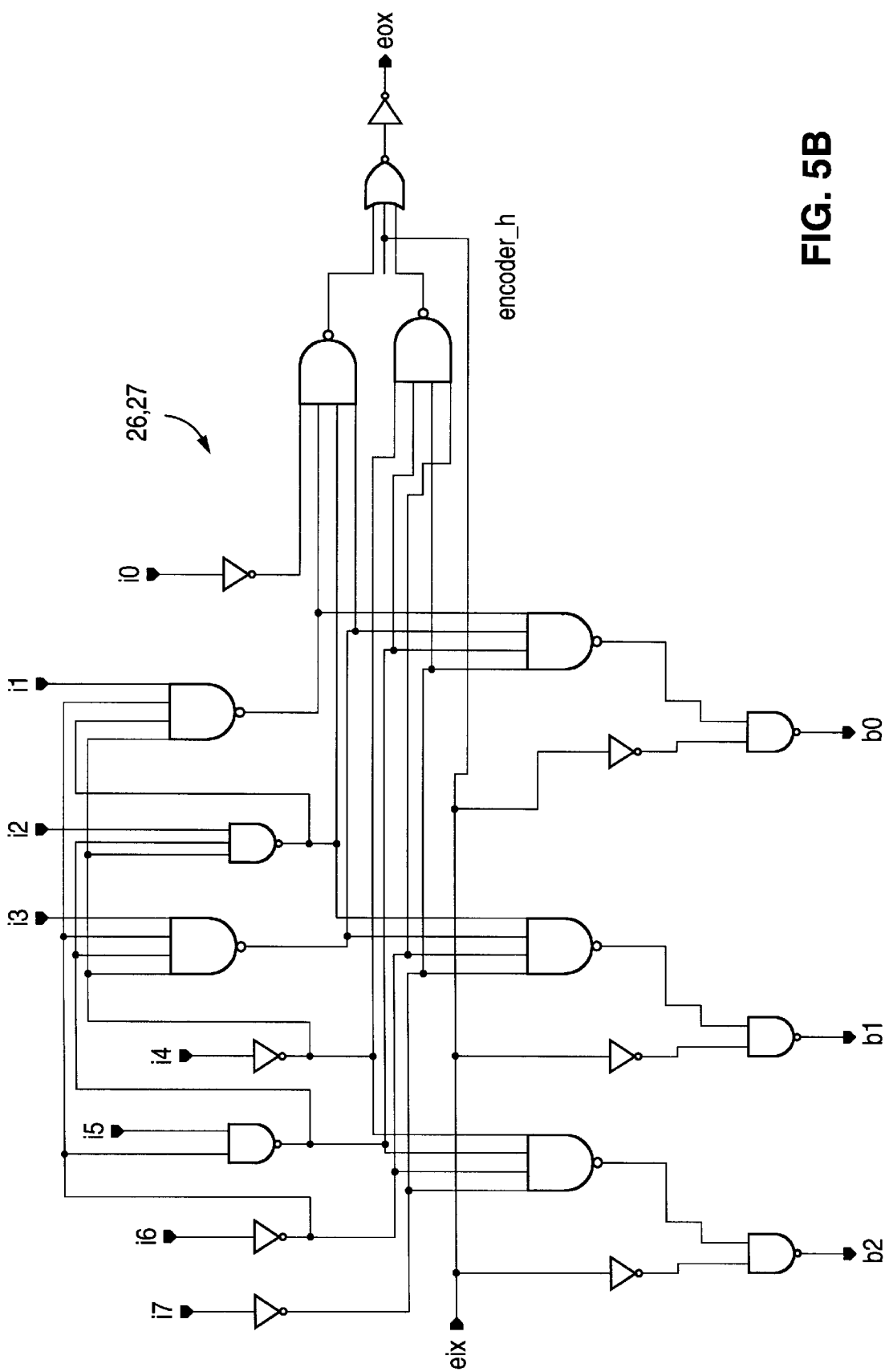
Figure 5C:
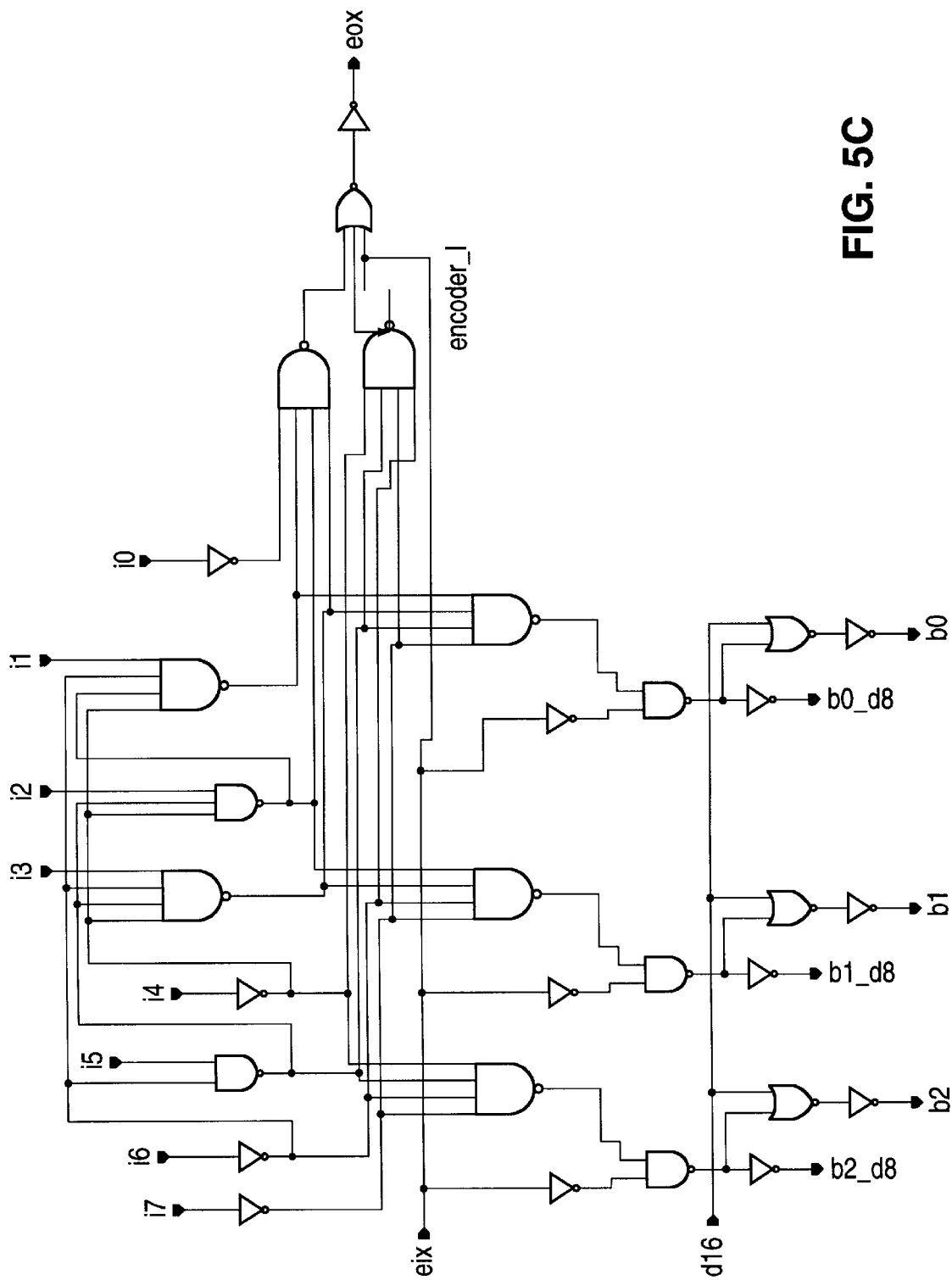
Figure 5D:
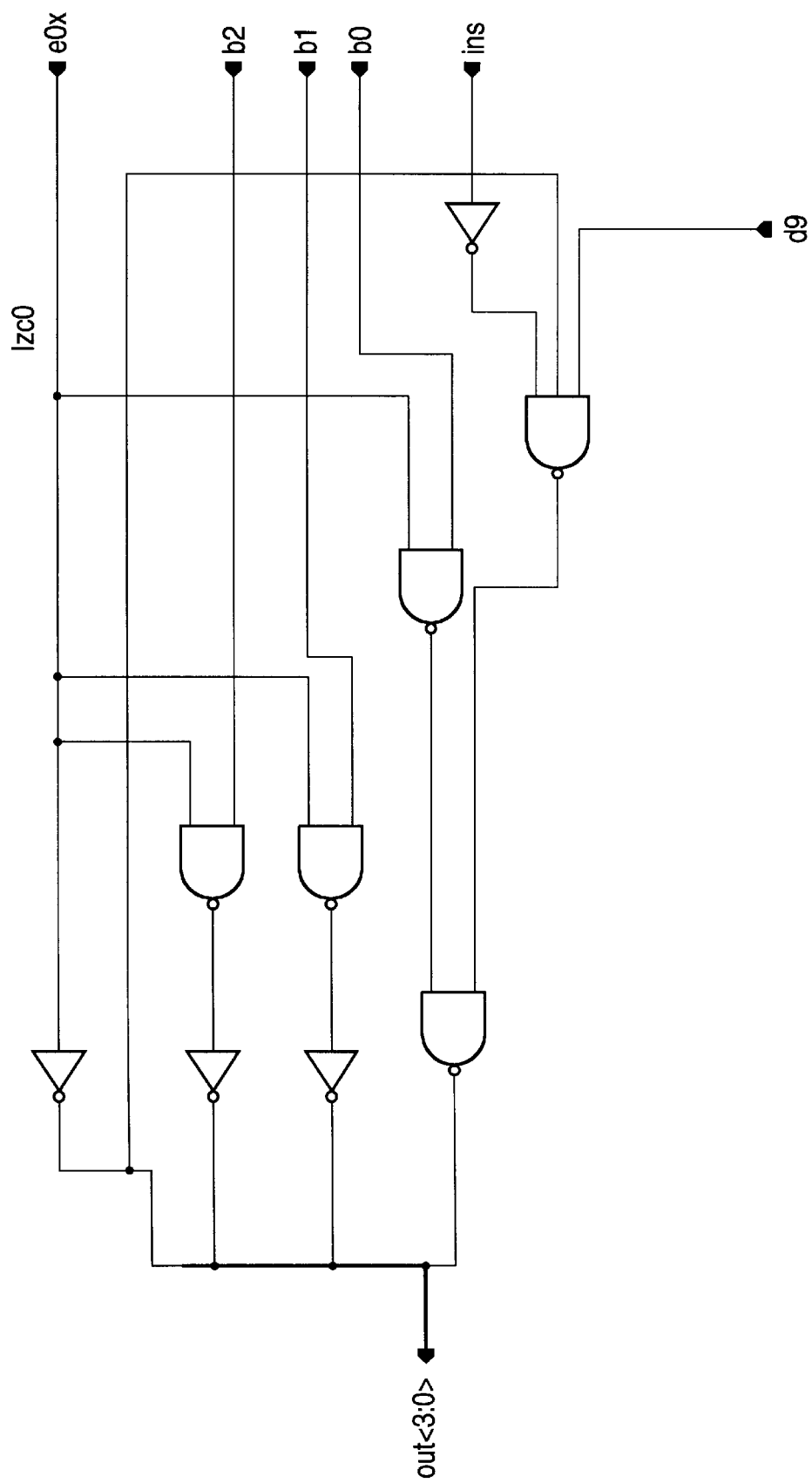
Figure 5F:
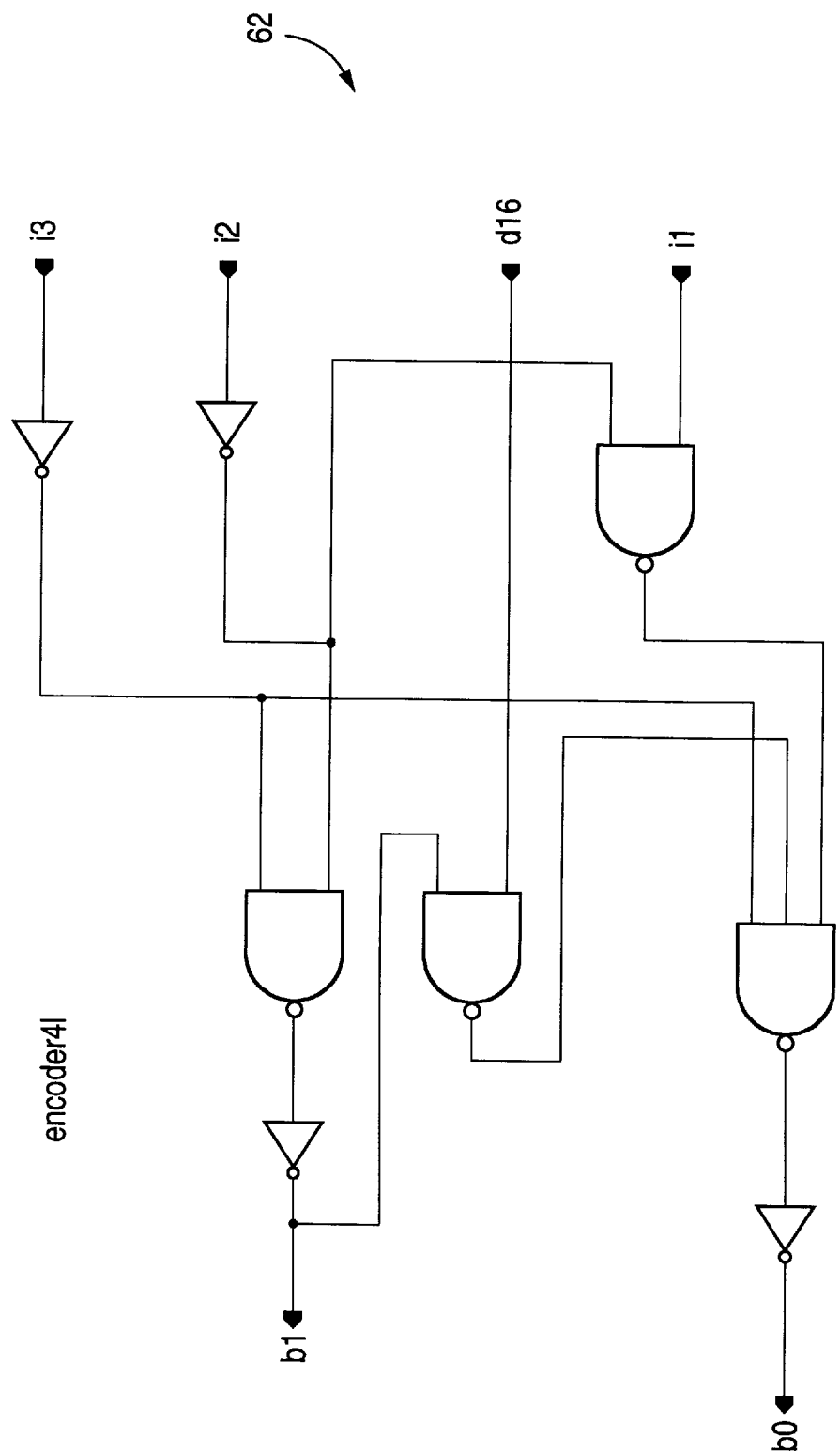

FIGS. 5A–5F are logic and transistor level diagrams of certain logic blocks in FIGS. 4A–4C. FIG. 5A is a circuit 56 used to interface the 36-bit input bus 12 to the 32-bit bus 22. FIG. 5B is the internal circuitry for encoders 26 and 27. FIG. 5C is the internal circuitry for encoders 24 and 25. FIG. 5D is the internal circuitry for the 8/9-bit counters 32–35. FIG. 5E is the internal circuitry in an encoder 60 forming part of the 16/32-bit counter 49/52 in FIG. 4B. And, FIG. 5F is the internal circuitry in an encoder 62 in the 16-bit counter 48 in FIG. 4B.

Figure 6:
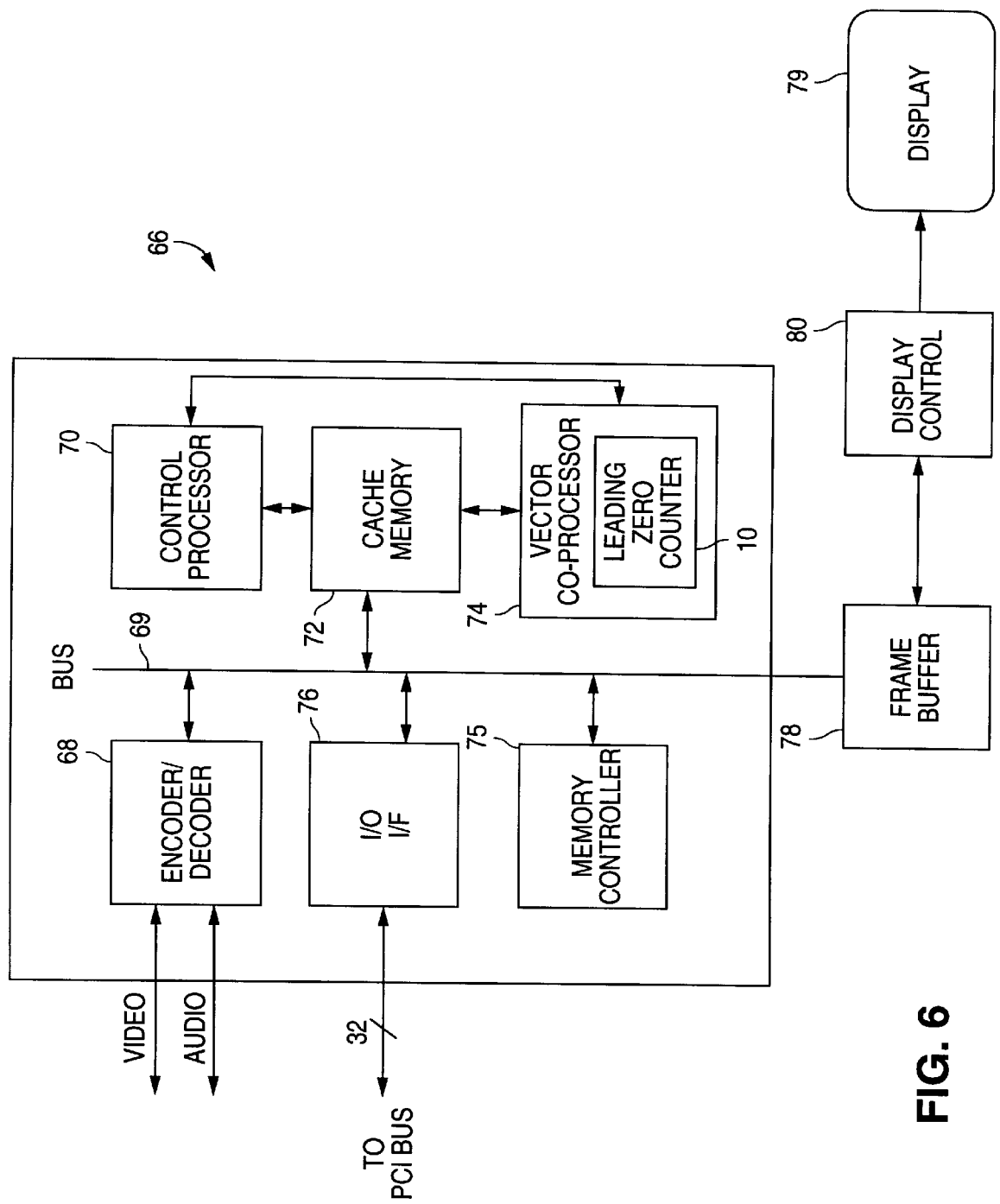
FIG. 6 illustrates the leading zero counter of FIGS. 1 and 4 connected to a floating point arithmetic unit in a flexible multimedia processor.

FIG. 6 illustrates a multimedia processing circuit 66 which contains circuitry for, among other things, processing video and audio data, controlling memory circuits and peripheral devices, and performing decoding and encoding of the video and audio signals. Various key components of the monolithic circuit 66 are illustrated in FIG. 6 and include an audio/video encoder/decoder 68 connected to bus 69, a control processor 70, a cache memory 72, a vector co-processor 74 (performing floating point arithmetic) containing the leading zero counter 10, a memory controller 75, and an input/output interface 76. Incoming video data is decoded, suitably processed, and applied to a frame buffer 78 for subsequent display on a display screen 79 via a display control circuit 80. The data processed within vector co-processor 74 may be in words of 8 bits, 9 bits, 16 bits, or 32 bits, depending upon the particular application of the circuit 66.

Description of Leading Zero Anticipator for a Sum for Use in Combination with an Adder In signal processing, such as performed in the vector co-processor 74 in FIG. 6, the leading zeroes in a sum of two binary numbers must be quickly calculated, since the leading zero count must be used to normalize the sum prior to the sum being used in a next calculation. In multiplication and division, a single operation entails many reiterative steps, and for each step the sum must be normalized. Accordingly, a significant amount of processing time may be saved by hastening this step of counting the leading zeroes in a sum in order to more quickly normalize the sum.

Figure 7:
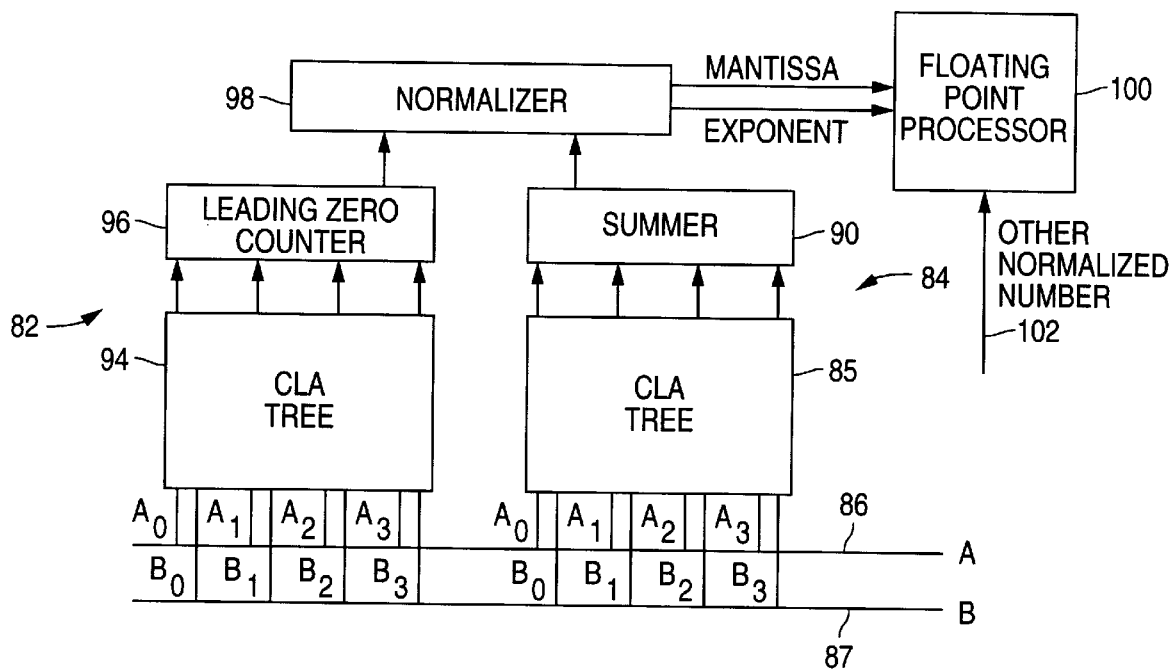
FIG. 7 illustrates another embodiment of a leading zero counter which counts the leading zeros in a sum of two binary numbers in parallel with the generation of the same su by a CLA adder.

FIG. 7 illustrates one embodiment of an inventive leading zero anticipator 82. A conventional carry look-ahead (CLA) adder 84 is shown on the right side of FIG. 7. Such CLA adders 84 are well known and will not be described in detail. Essentially a CLA adder consists of a carry tree 85 which calculates the carry bits for each bit position when adding two binary numbers A and B on buses 86 and 87. These carry bits, along with the bits on buses 86 and 87, are then applied to a summing circuit 90 for generating the final sum bits. Equation 1 below is the well known equation for generating a sum bit $S_i$ for two binary numbers $A_i$ and $B_i$, for the bit position i, where $C_{i-1}$ is the carry bit from the next lower significant bit position.

$$S_i = (A_i \, XOR \, B_i) XOR \, C_{i-1} \qquad \text{Eq. 1}$$

The equations presented herein are also shown or described in the book *Computer Architecture: A Quantitative Approach*, Appendix A, by David A. Patterson and John L. Hennessy, ISBN 1-55860-069-8, incorporated herein by reference. Other representative CLA adders are described in the book *Integrated Circuitry in Digital Design*, pages 236–248, by Arpad Barna et al., ISBN 0-471-05050-4, 1973, and in U.S. Pat. Nos. 5,283,755; 5,278,783; and 5,276,635, all incorporated herein by reference.

A CLA adder is very fast in that carries of lower significant bit positions and carries of more significant bit positions are generated in parallel.

The leading zero anticipator 82 of this present invention is shown on the left side of FIG. 7 and calculates the leading zeroes of the sum of two binary numbers A and B at approximately the same time that the sum is generated by the CLA adder 84. The leading zero anticipator 82 includes a carry tree portion 94 and a counting portion 96. The leading zero count and the sum are applied to a normalizer circuit 98, which normalizes the sum by shifting the sum to the left so that the radix point is to the right of the first 1 in the binary sum and by generating an exponent. The normalized number is then used by a floating point processor 100 in a next arithmetic operation. A number on conductors 102 to be added to the normalized sum generated by CLA adder 84 may be normalized by using the leading zero counter 10 illustrated in FIG. 1 so that the two normalized binary numbers may now be operated on using the floating point processor 100. More detail of the leading zero anticipator 82 is illustrated in FIG. 8.

Figure 8:
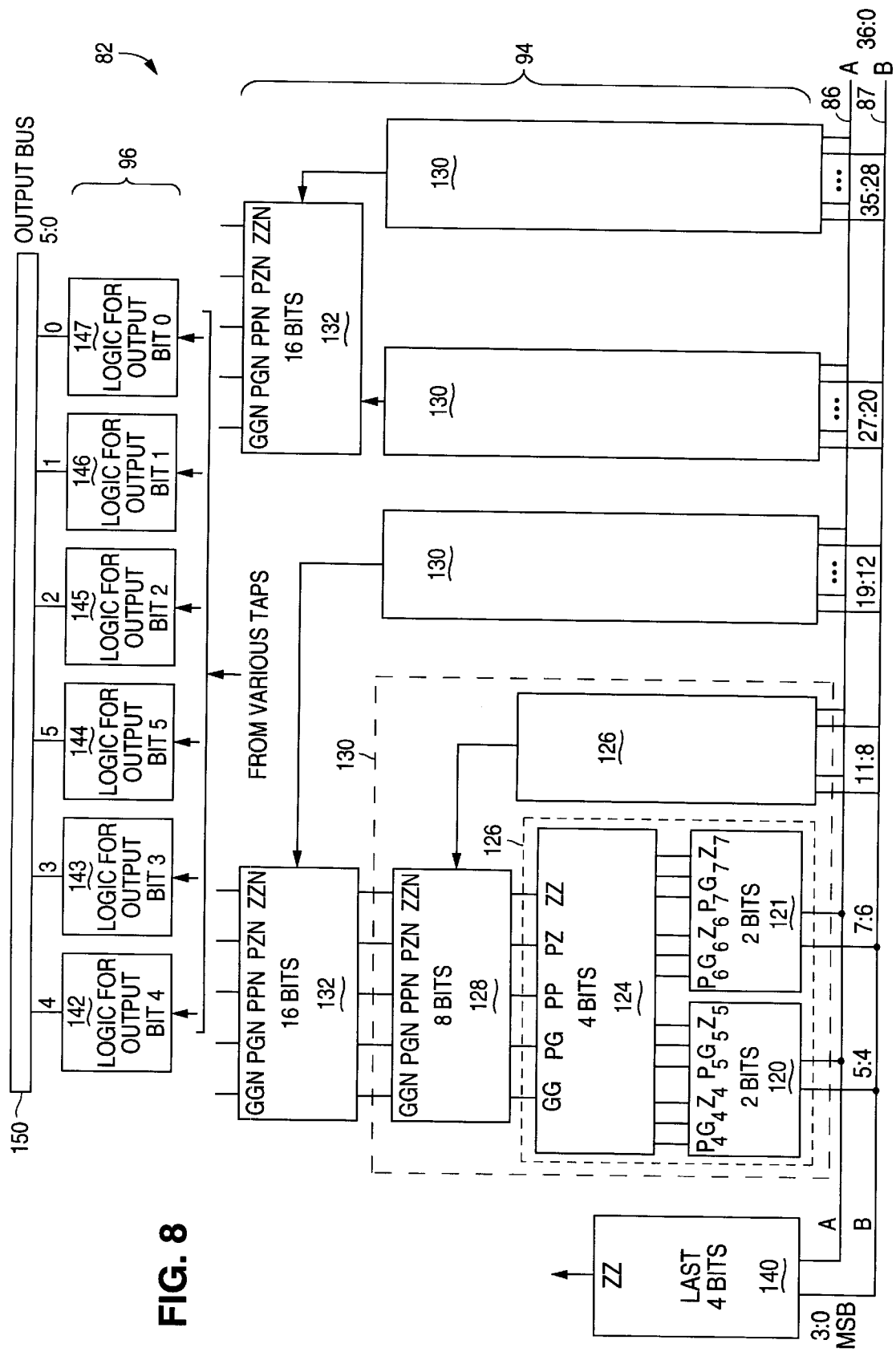
FIG. 8 illustrates in greater detail the invention of FIG. 7.

FIG. 8 is a block diagram of the preferred embodiment of the leading zero anticipator 82, which generates a leading zero count for the sum of the two numbers A and B on the 36-bit wide buses 86 and 87. Since the circuit of FIG. 8 comprises repeated building blocks, building blocks which are identified with the same numeral have identical structure.

In FIG. 8, the carry tree portion 94 and the leading zero counter portion 96 are identified. The various logic blocks identified in FIG. 8 generate propagate ($P_i$), carry or generate ($G_i$), zero ($Z_i$), and intermediate signals ($PG_i$, $PZ_i$, $GG_i$, $PP_i$, $ZZ_i$, $PGN_i$, $PZN_i$, $GGN_i$, $PPN_i$, and $ZZN_i$), as indicated at the outputs of the various logic blocks. Simple logical relationships between these values are listed below.

$P_i = A_i \text{ XOR } B_i$
$G_i = A_i B_i$
$Z_i = A_i \text{ NOR } B_i$
$PP_1 = P_i P_{i-1} P_{i-2} P_{i-3}$
$ZZ_i = Z_i Z_{i-1} Z_{i-2} Z_{i-3}$
$GG_i = G_i G_{i-1} G_{i-2} G_{i-3}$
$PG_i = P_i P_{i-1} P_{i-2} Z_{i-3} + P_i P_{i-1} Z_{i-2} G_{i-3} + P_i Z_{i-1} G_{i-2} G_{i-3} + Z_i G_{i-1} G_{i-2} G_{i-3}$
$PZ_i = P_i P_{i-1} P_{i-2} G_{i-3} + P_i P_{i-1} G_{i-2} Z_{i-3} + P_i G_{i-1} Z_{i-2} Z_{i-3} + G_i Z_{i-1} Z_{i-2} Z_{i-3}$
$PPN_i = PP_i PP_{i-1}$
$ZZN_i = ZZ_i ZZ_{i-1}$
$GGN_i = GG_i GG_{i-1}$
$PGN_i = PP_i PG_{i-1} + PP_i GG_{i-1}$
$PZN_i = PZ_i ZZ_{i-1} + PP_i PZ_{i-1}$ By using the interconnections illustrated in FIGS. 8, 9A, 9B, and 10A–10I and the various relationships above, the output signals of each of the logic blocks may be determined simply by the numbers A and B.

The binary numbers A and B at bit positions 7:4 are coupled to the inputs of 2-bit logic blocks 120, 121 (which are identical) to generate the PGZ signals. Block 120 is shown in detail in FIG. 10A. The outputs of the blocks 120, 121 are applied to the input of logic block 124, which generates the signals ZZ, GG, PP, PG, PZ for the four bit positions 7:4. Block 124 is shown in detail in FIG. 10B. A combination of the blocks 120, 121, and 124 are grouped into a single block 126 identified in dashed outline. This identical block 126 has as its inputs the A and B numbers at bit positions 11:8. The outputs of the two blocks 126 are applied to the inputs of logic block 128. Block 128 is shown in detail in FIG. 10C. The combination of blocks 120, 121, 124 and 128 are identified by numeral 130.

An identical combination of blocks labelled 130 has as its inputs the A and B numbers at bit positions 19:12. The outputs of the two blocks 130 are applied to the input of logic block 132 for bit positions 19:4. The identical structure is duplicated for bit positions 35:20.

The bits at bit positions 3:0 are processed by logic block 140, which contains the 2-bit blocks 120 and 121 plus additional logic. Block 140 is shown in detail in FIG. 10D. The reason why a separate block 140 is used for bit positions 3:0 is because the carry tree 94 is formed based on powers of 2, and 36 bits are not a power of 2. The ability to fully utilize a 36-bit bus in the leading zero anticipator 82 enables the processing of 9-bit words commonly used in video applications, as discussed with respect to FIG. 1.

Figure 9A:
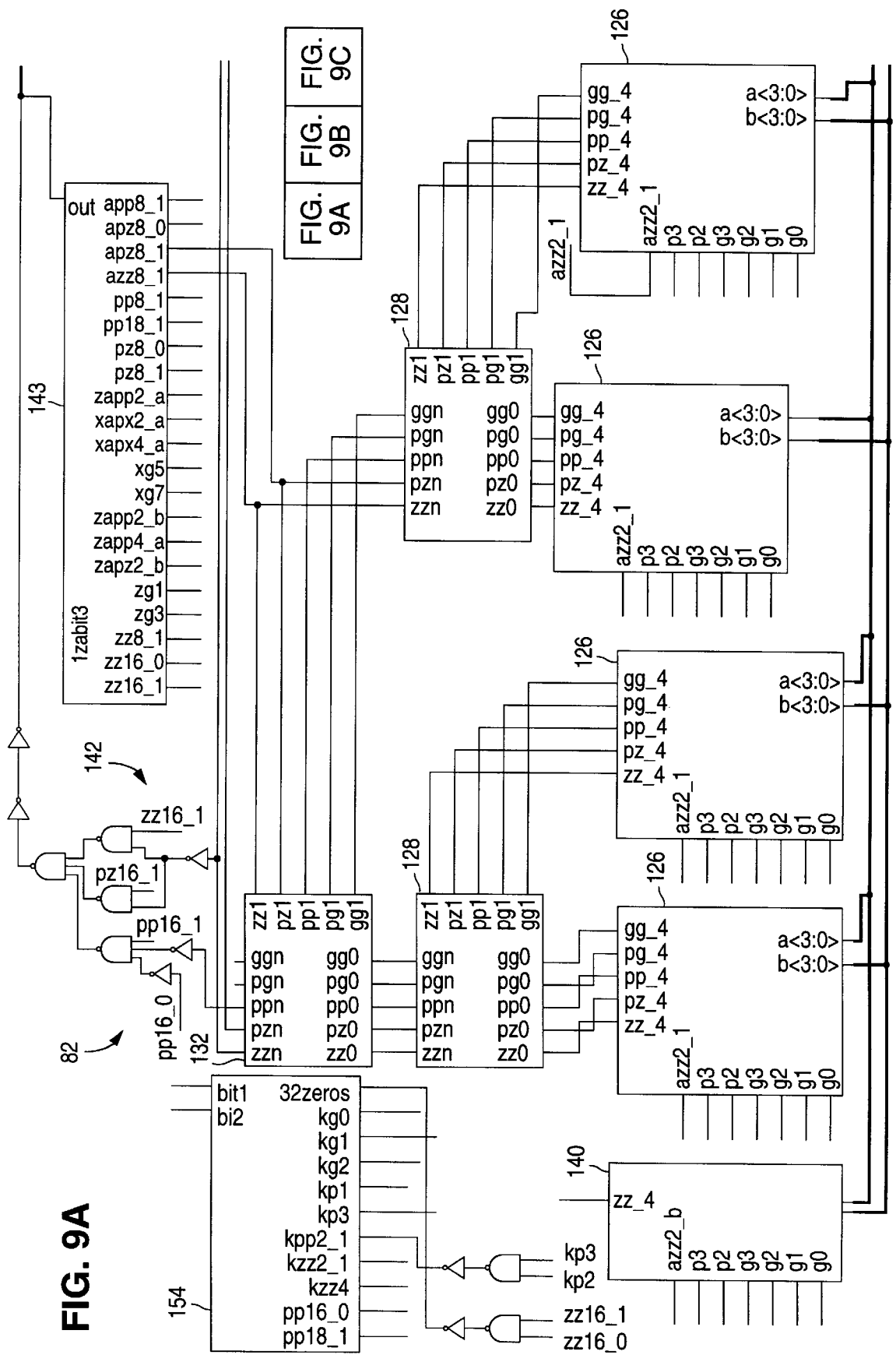
FIG. 9A, 9B, and 9C constitute a block and logic level diagram of the actual leading zero anticipator.
Figure 9B:
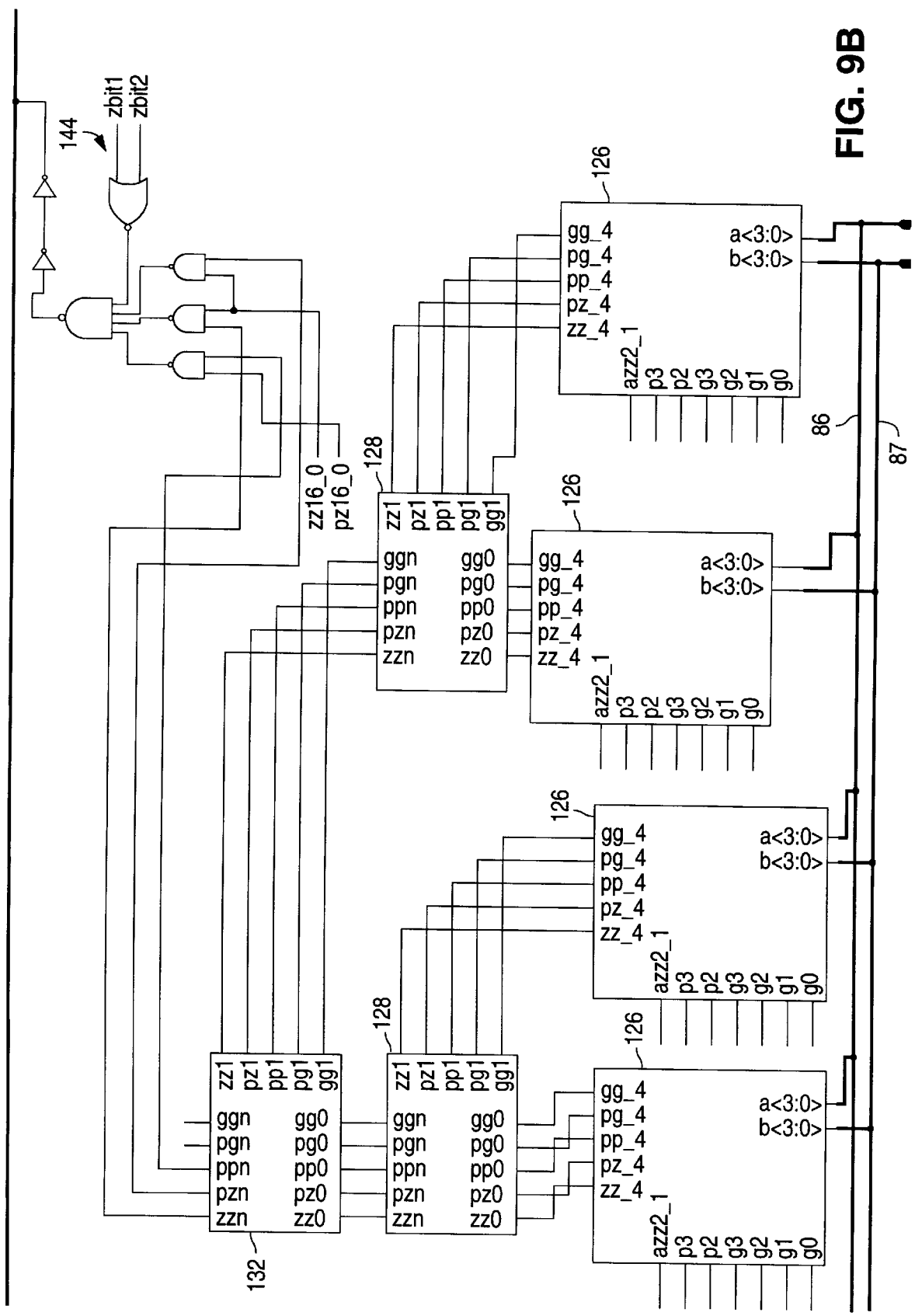

The various outputs of the logic blocks 120, 121, 124, 128, 132, and 140, in various combinations, are applied to the inputs of logic blocks 142, 143, 144, 145, 146, and 147, as shown in FIG. 9B. Each of the logic blocks 142–147 is uniquely associated with a bit position on a 6-bit output bus 150, which can support a full 32 leading zero count in a sum of two 32-bit words A and B.

Figure 9C:
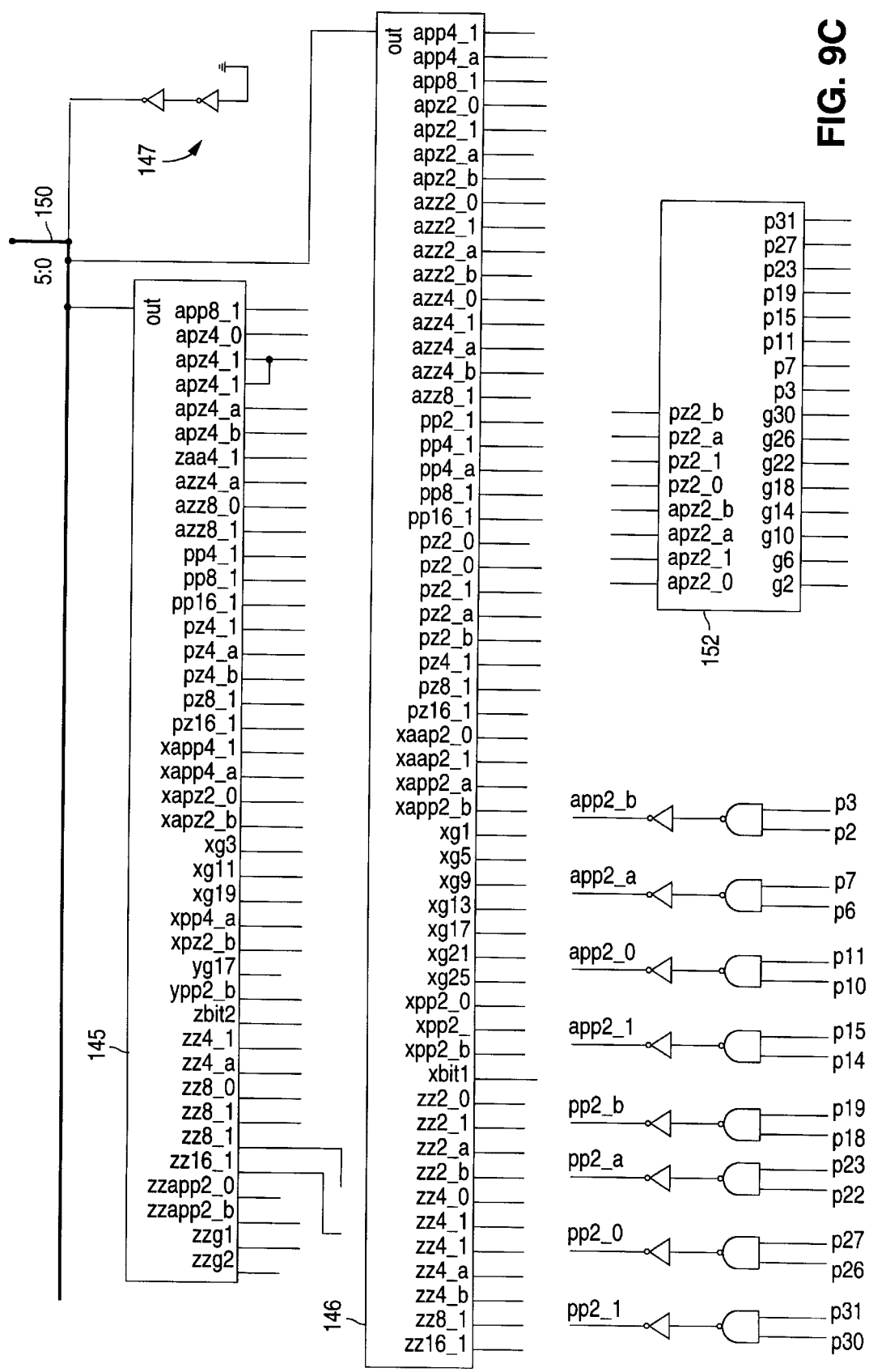

FIGS. 9B, and 9C illustrate in greater detail the logic blocks and interconnections between the various logic blocks in an actual embodiment of the invention. Showing lines interconnecting the various logic blocks would make FIGS. 9A and 9B unreadable. Accordingly, the various outputs of the logic blocks are identified with codes, and inputs to the other logic circuits are identified with the same code to signify a conductive coupling between the inputs and outputs. One skilled in the art will be able to recreate the actual circuit using the schematic diagrams of FIGS. 9A, 9B, 9C and 10A–10I. In the actual embodiment, shown in FIG. 9B, the bit position 0 in output bus 150 is tied to a logical 0 to reduce the size of the leading zero anticipater. By knowing that the leading zero count can be off by one, the sum of the two numbers is first shifted by the count on output bus 150, and a simple logic circuit determines whether there is still a zero immediately to the left of the radix point. If so, the sum is simply shifted to the left by one bit position. This circuit has been found to use less silicon area than a leading zero anticipator incorporating an additional logic block, such as block 145 or 146 in FIG. 9C, for bit position 0 in output bus 150. However, one may implement the leading zero anticipator using such a logic block to slightly reduce the time of the floating point operation.

A cross-reference between the logic blocks of FIGS. 8, 9A, 9B, and 9C and the logic level diagrams of FIGS. 10A–10J is listed below.

Figure 10A:
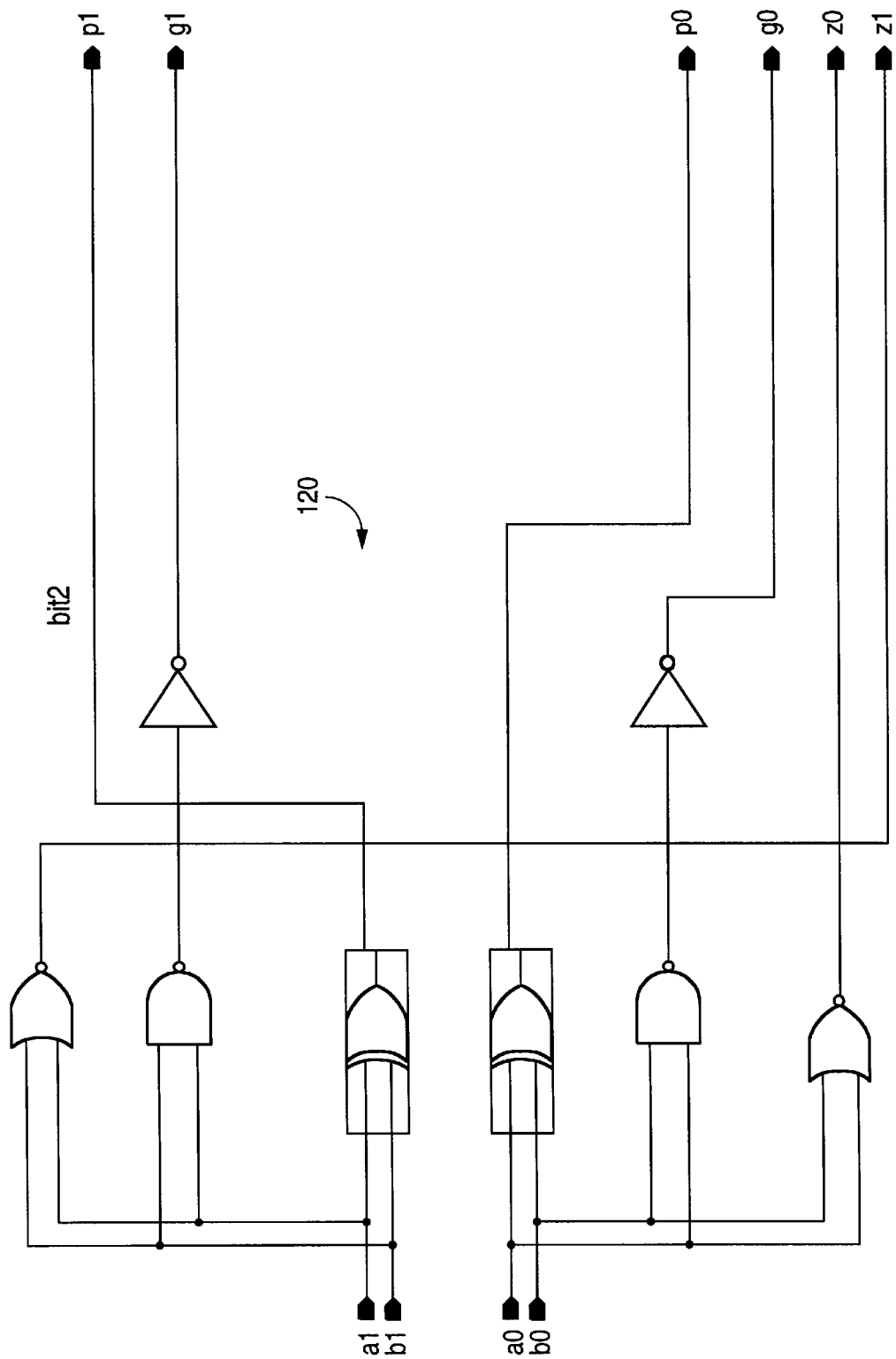
FIGS. 10A–10I illustrate the circuitry of FIGS. 9A, 9B, and 9C in greater detail.

Logic block 120: FIG. 10A.

Figure 10B:
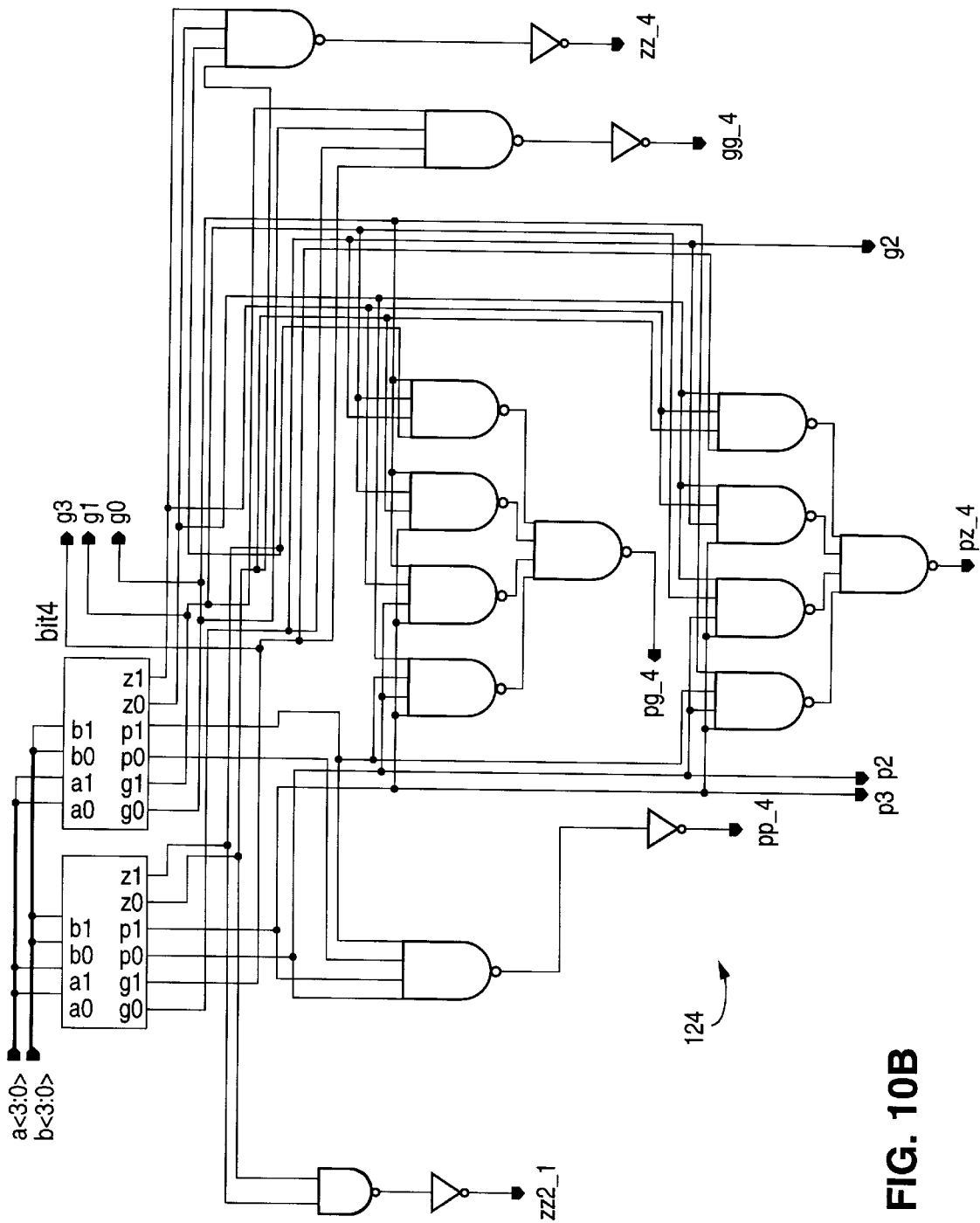

Logic block 124: FIG. 10B (logic blocks 120 and 124 form logic block 126).

Figure 10C:
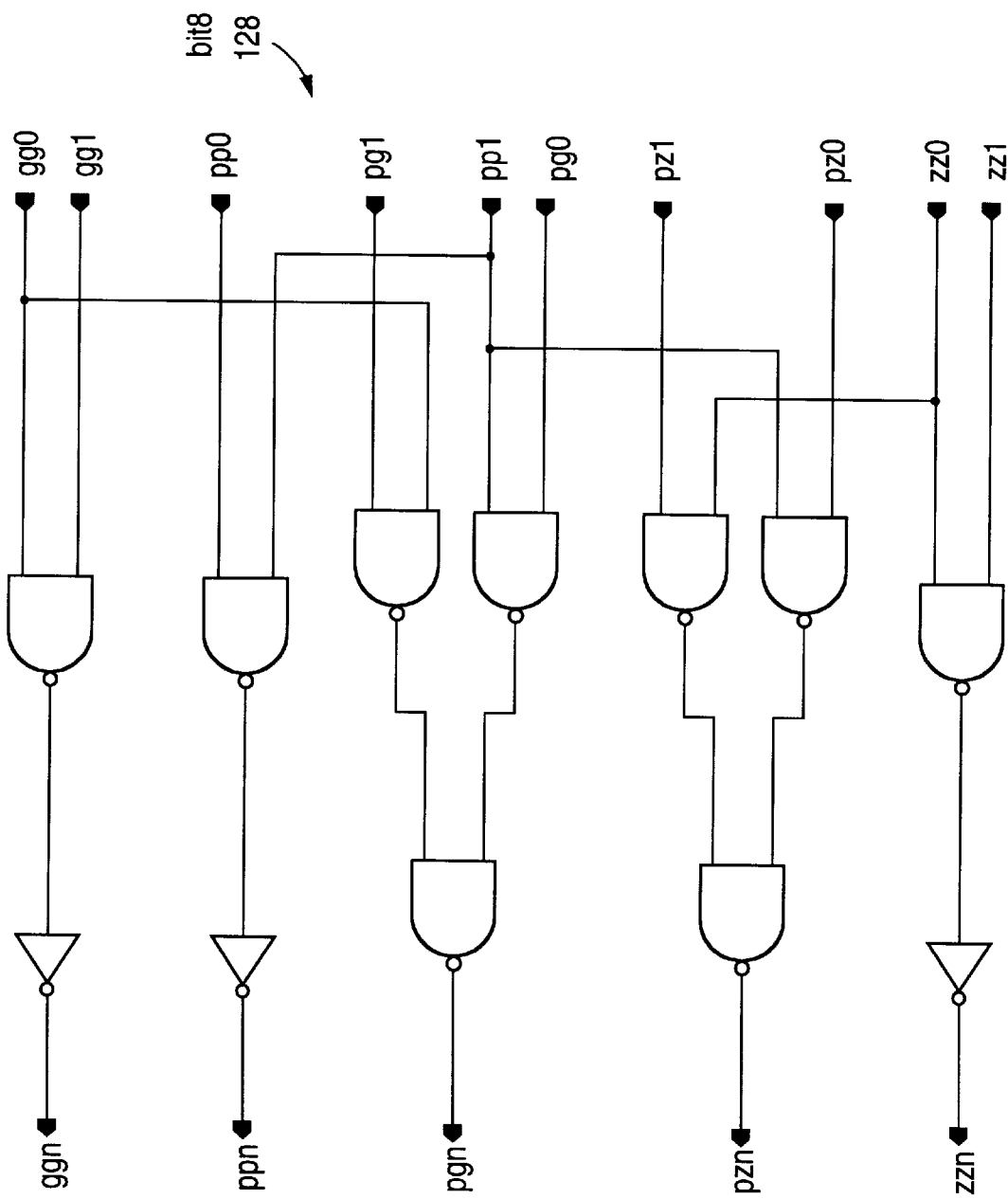

Logic block 128: FIG. 10C

Figure 10D:
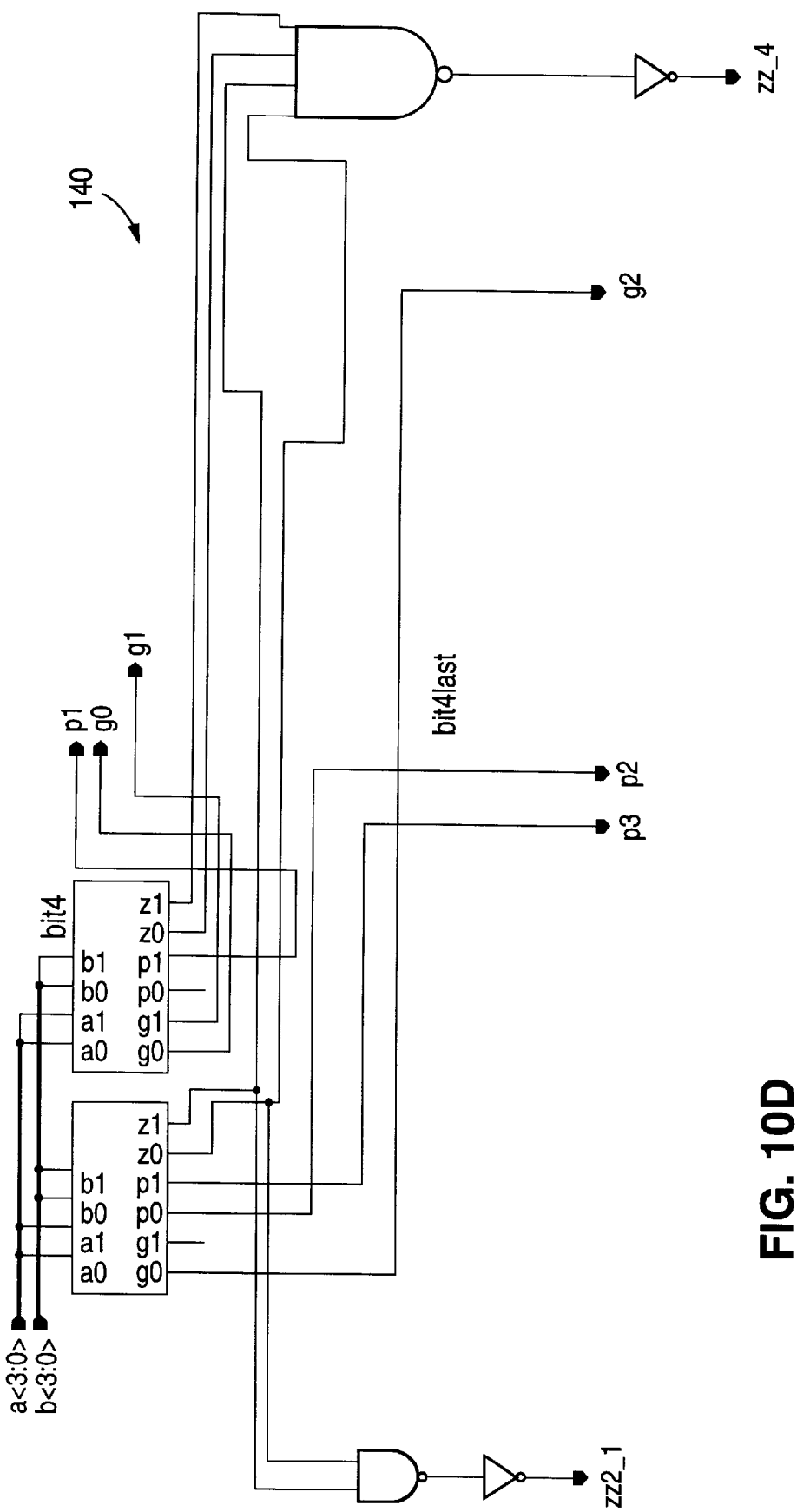

Logic block 140: FIG. 10D

Figure 10E:
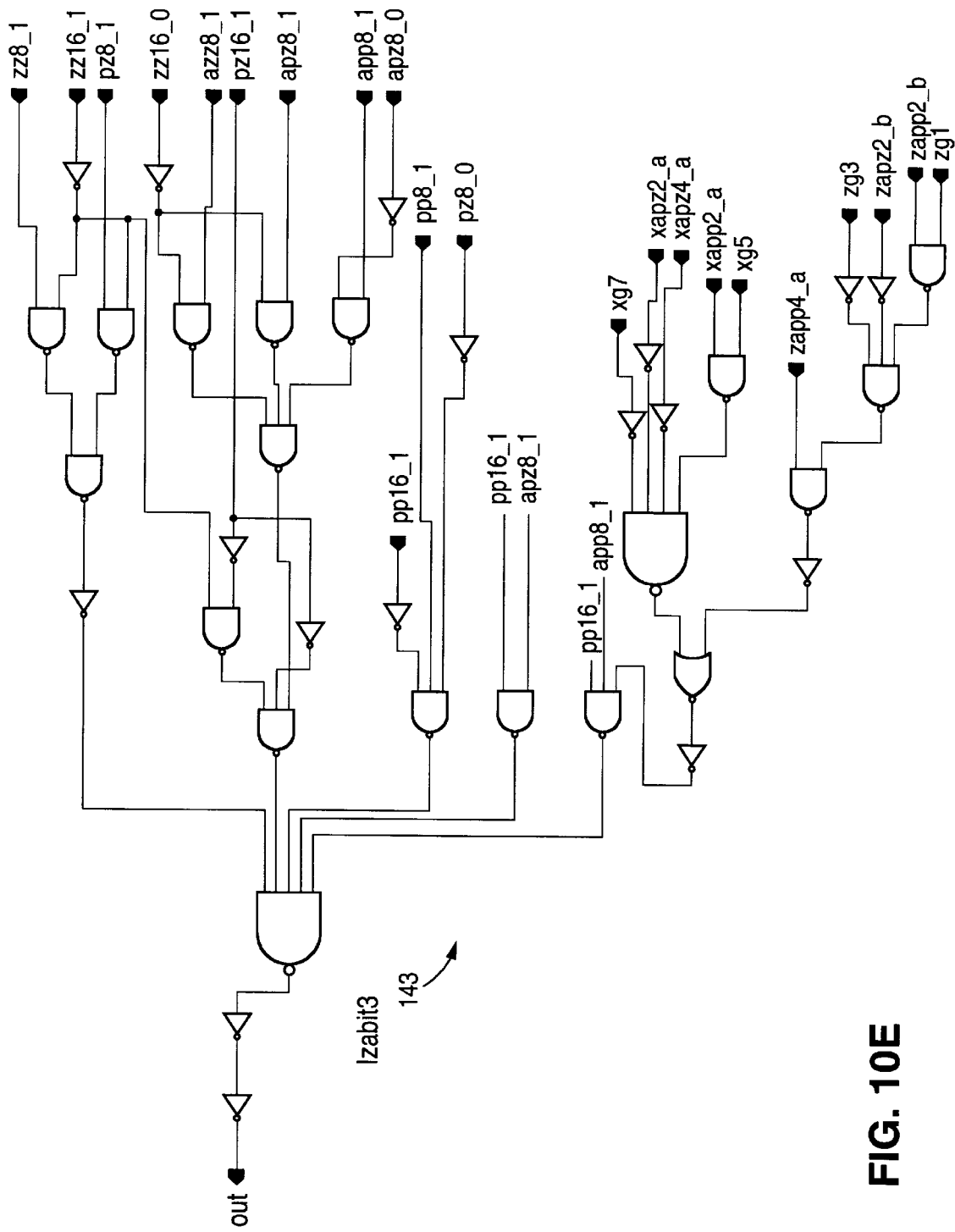

Logic block 143: FIG. 10E

Figure 10F:
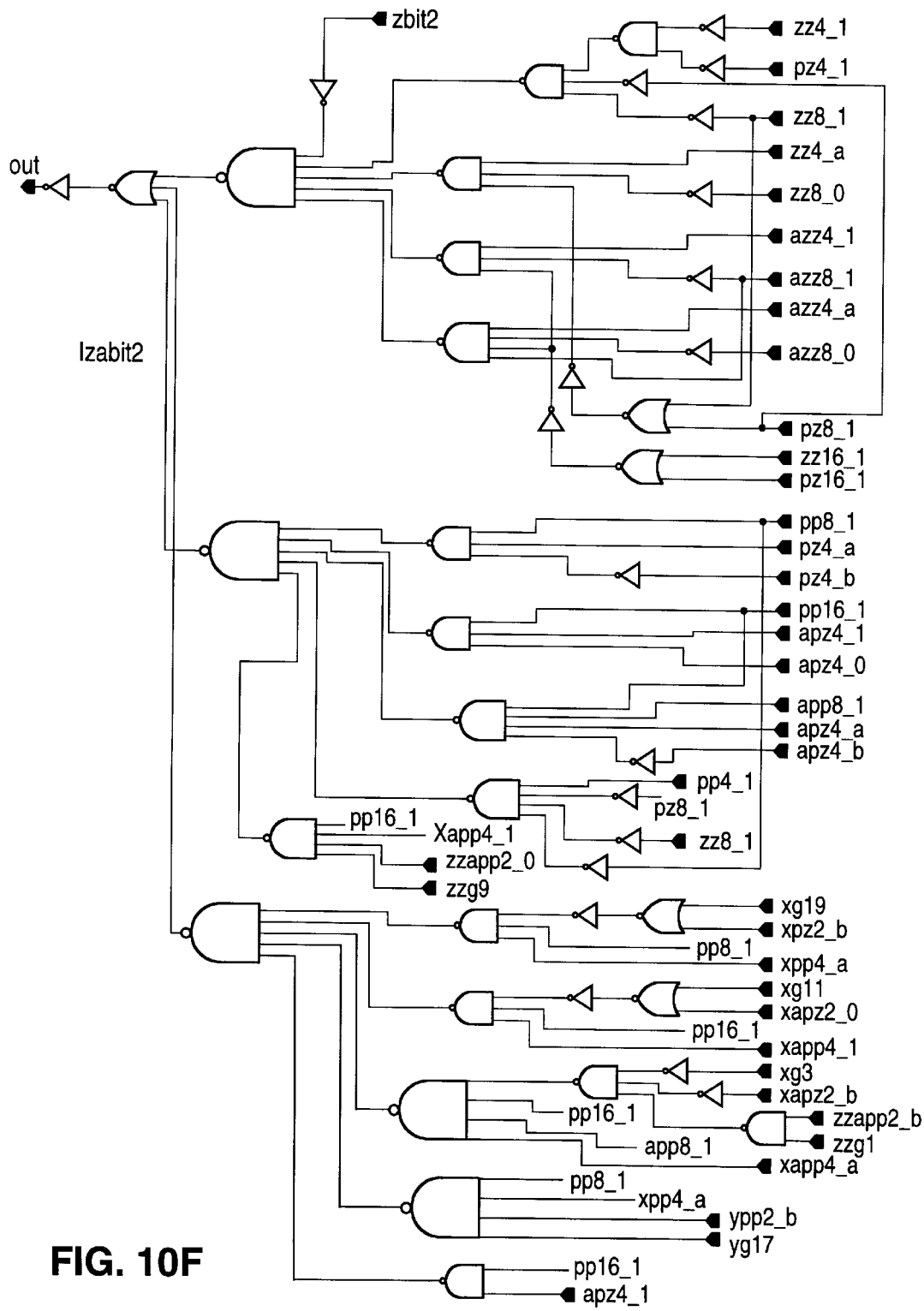

Logic block 145: FIG. 10F

Figure 10G:
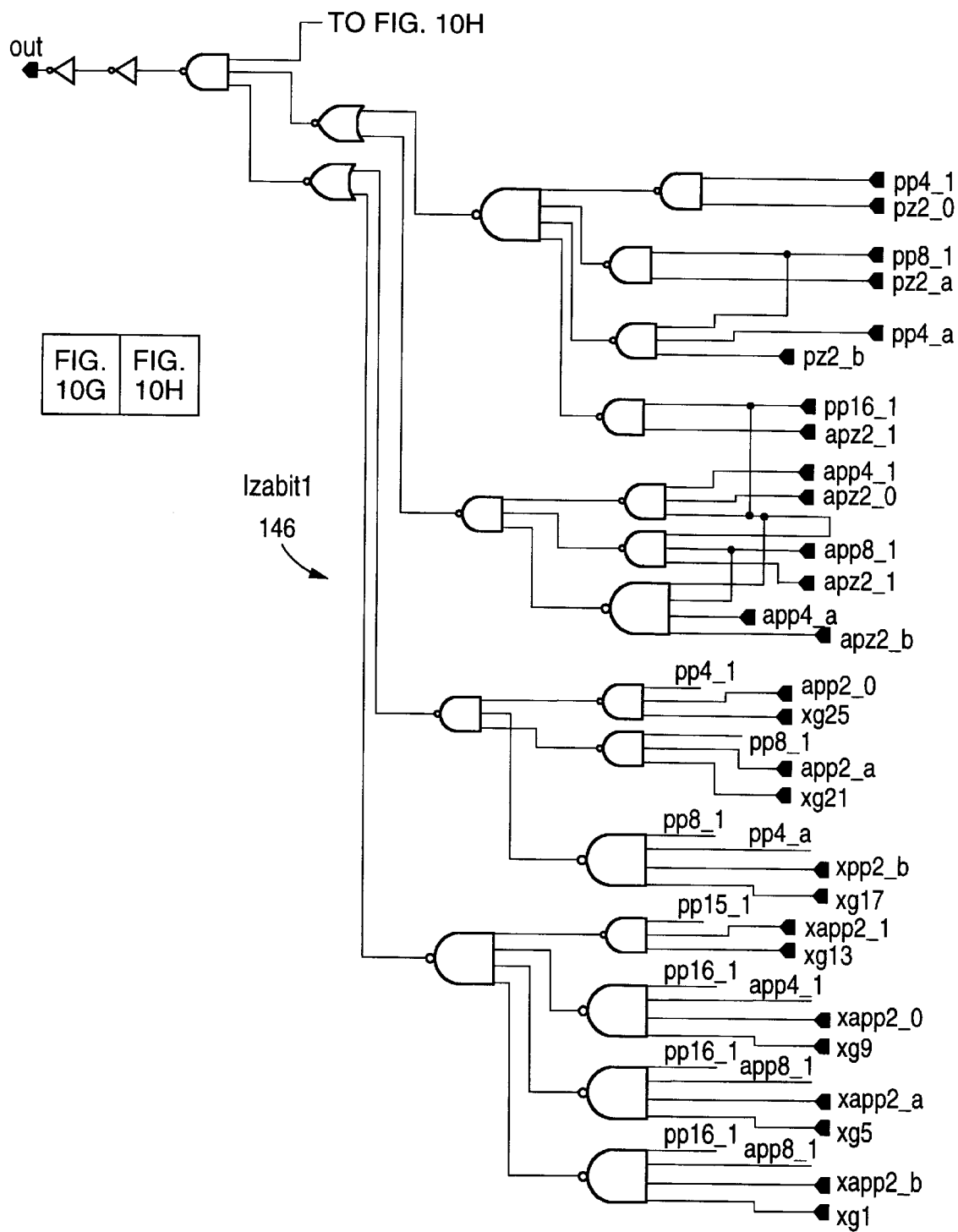
Figure 10H:
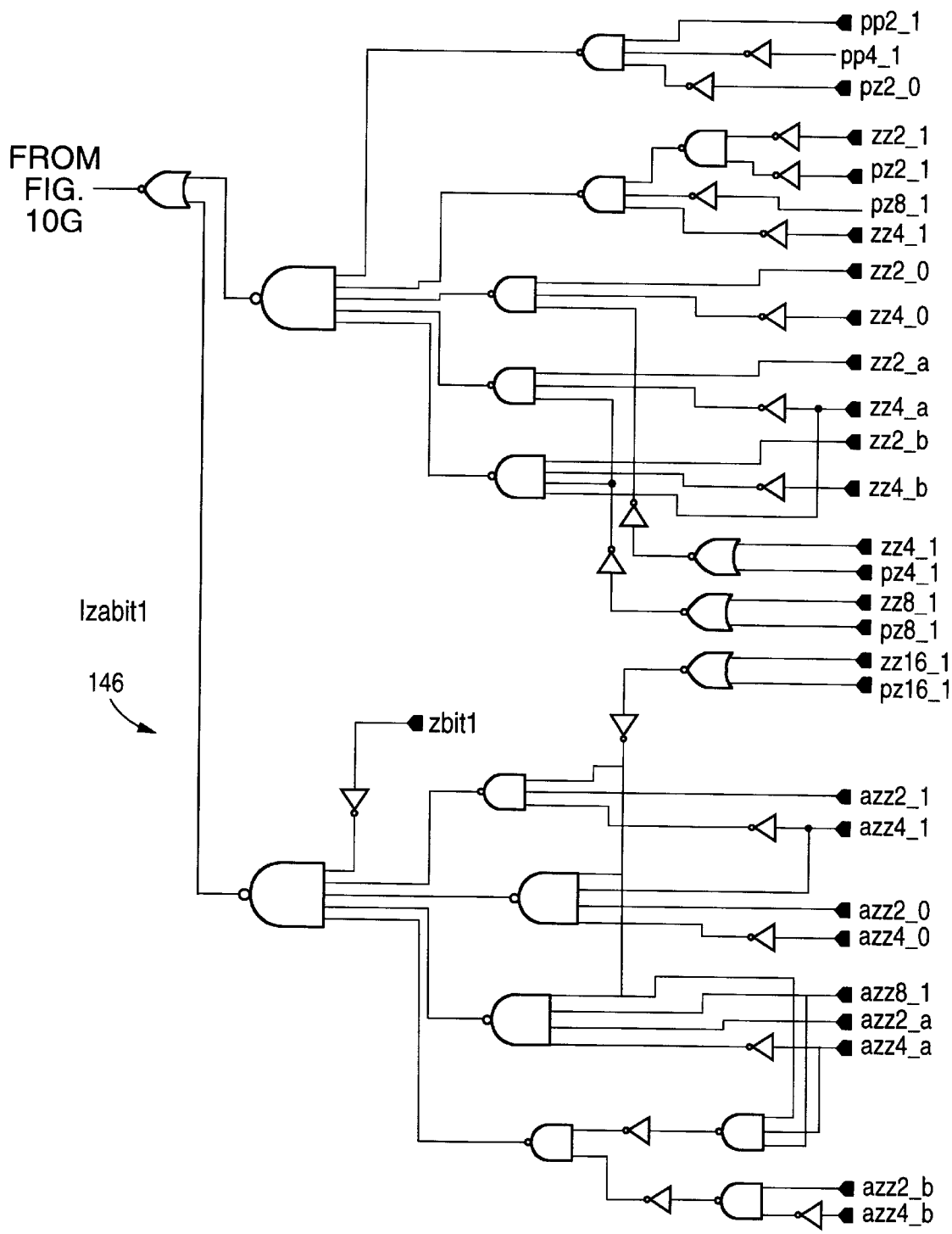

Logic block 146: FIGS. 10G and 10H

Figure 10I:
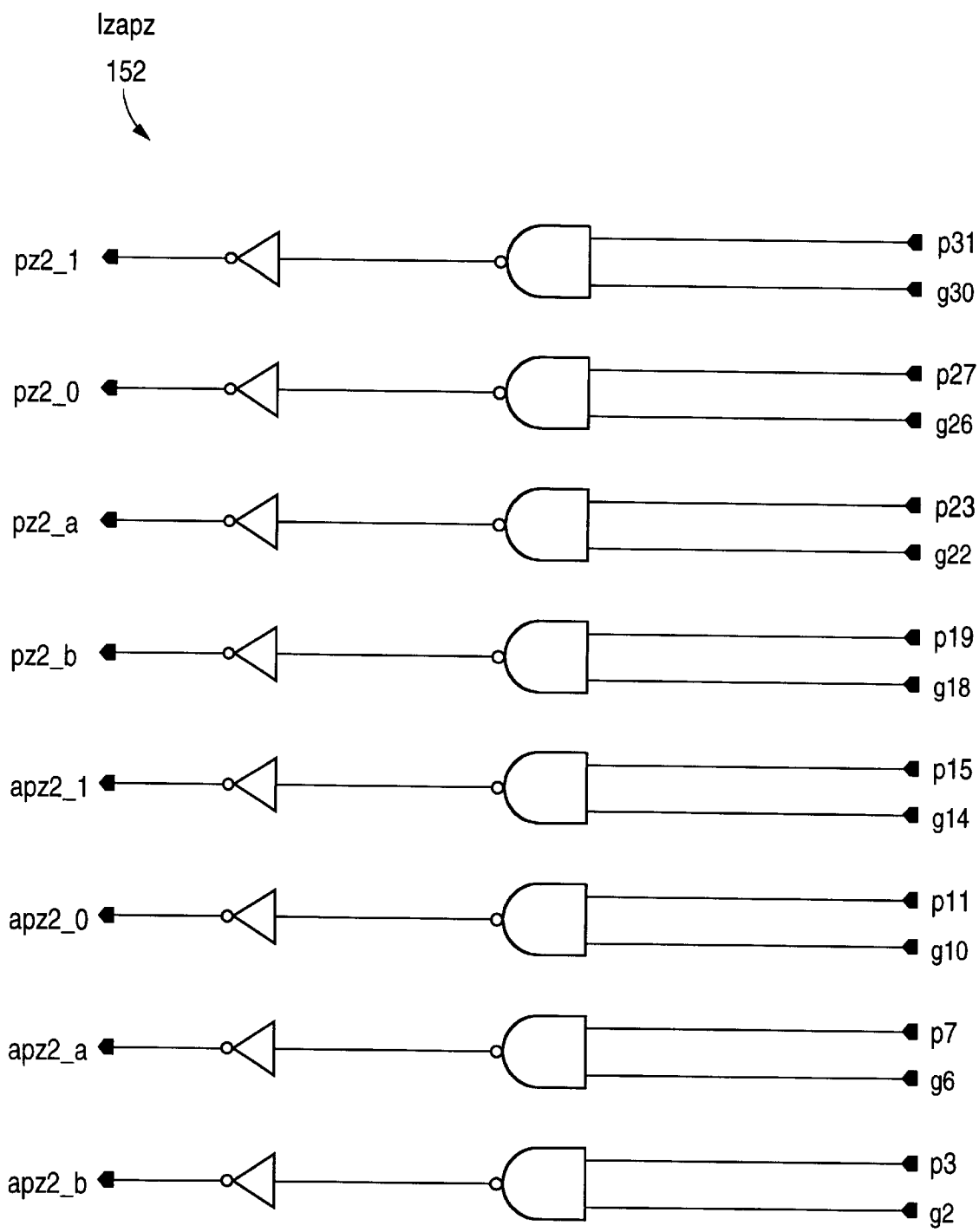

Logic block 152: FIG. 10I

Figure 10J:
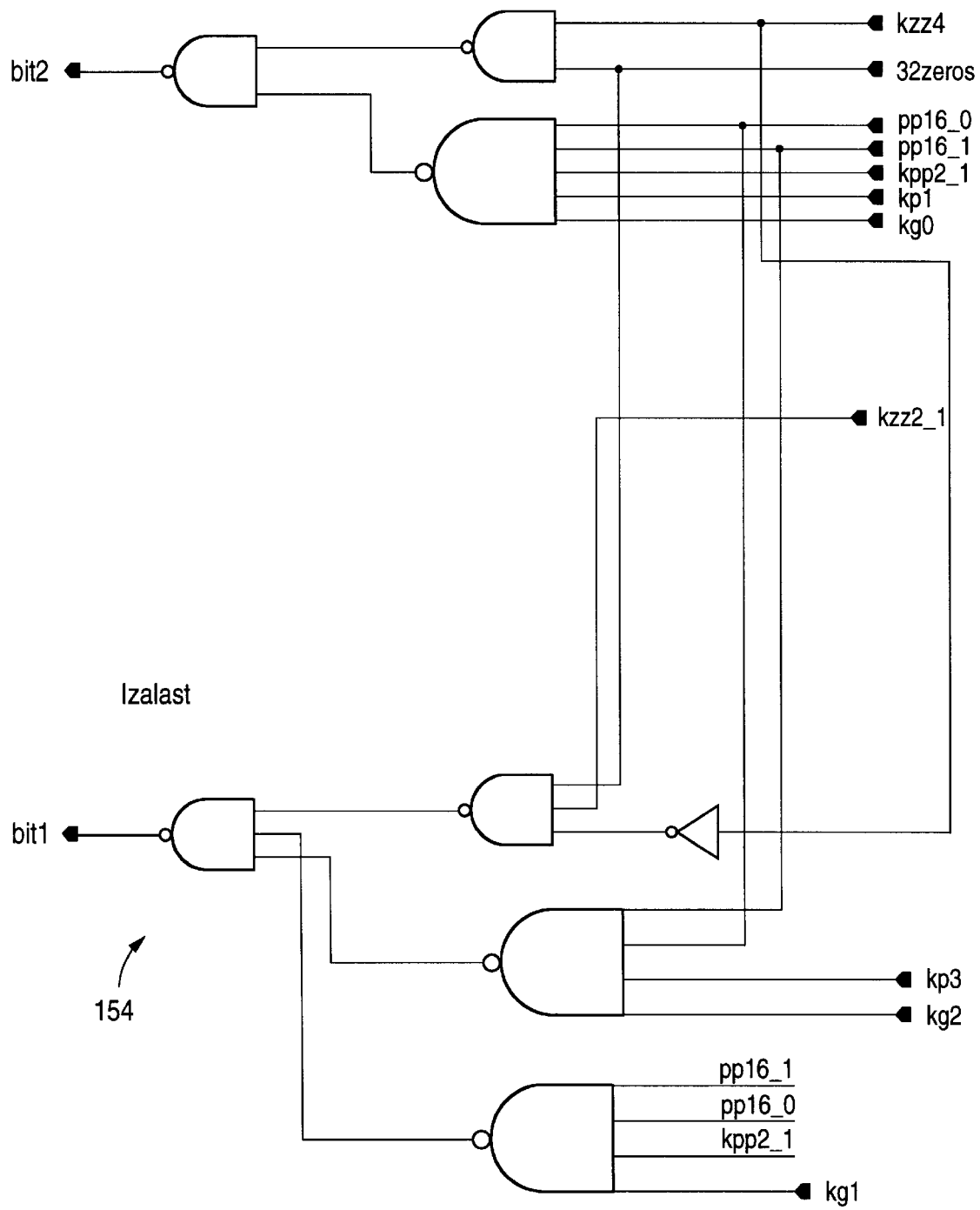

Logic block 154: FIG. 10J

Applicants have discovered that by providing a separate logic block 142–147 dedicated to each bit position in an output bus 150, the generation of the leading zeroes in a resulting sum of two numbers can be more quickly determined as compared to using conventional techniques. Additionally, the use of a leading zero anticipator 82 which combines a carry tree portion 94 and a counter portion 96 incurs delays substantially equivalent to that of a conventional CLA adder 84 (FIG. 7) which incorporates a carry tree portion 85 and a summing portion 90. As a result, the leading zero count will be generated at approximately the same time as the sum of the two binary numbers so as to avoid any delay in waiting for the leading zero count.

It should be understood that this leading zero count may also be performed for two numbers which are being subtracted, since summing also applies to the addition of a positive number and a negative number.

Once the sum is generated, the sum will be shifted in accordance with the leading zero count to generate a sum complying with the IEEE standard for floating point arithmetic.

CONCLUSION

A number of circuits which generate a leading zero count are described. It would be understood by those skilled in the art that the various functions performed by the leading zero counters may be performed using equivalent logic circuits, which would be understood by those skilled in the art after reading this disclosure. The leading zero counter circuits may also be used to count leading ones, when dealing with negative numbers, by simple changes in the logic circuitry, as would be understood by those skilled in the art. Although leading zero counters for a 36-bit wide bus have been described, the counters are essentially built by modules, where the size of the counter may be enlarged or reduced simply by adding or deleting modules. Hence, the teachings herein may be used to form leading zero counters and anticipators of any size.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A circuit for counting leading zeroes in a binary number comprising:

a 36-bit wide input bus for carrying either a 32-bit word, two 16-bit words, four 9-bit words, or four 8-bit words;

a 32-bit wide bus electrically connected to 32 conductors in said 36-bit wide bus, a four remaining conductors in said 36-bit wide bus for carrying a 9th bit of four 9-bit words on said 36-bit wide bus;

four 8-bit encoders, each encoder coupled to a different group of 8 conductors on said 32-bit wide bus for outputting an encoded value corresponding to 8 bits on said 8 conductors;

a first leading zero counter for receiving bits from a first one of said encoders for determining a leading zero count of a first 8 or 9-bit word on said 36-bit wide bus;

a second leading zero counter for receiving bits from a second one of said encoders for determining a leading zero count of a second 8 or 9-bit word on said 36-bit wide bus;

a third leading zero counter for receiving bits from a third one of said encoders for determining a leading zero count of a third 8 or 9-bit word on said 36-bit wide bus a fourth leading zero counter for receiving bits from a fourth one of said encoders for determining a leading zero count of a fourth 8 or 9-bit word on said 36-bit wide bus;

a fifth leading zero counter for receiving bits from said first one of said encoders and said second one of said encoders for determining a leading zero count of a first 16-bit word on said 36-bit wide bus;

a sixth leading zero counter for receiving bits from said third one of said encoders and said fourth one of said encoders for determining a leading zero count of a second 16-bit word on said 36-bit wide bus;

a seventh leading zero counter receiving bits from said four 8-bit encoders for determining a leading zero count of a 32-bit word on said 36-bit wide bus;

a first multiplexer for receiving a count from said first leading zero counter, said fifth leading zero counter, and said seventh leading zero counter and for outputting a count from one of said first leading zero counter, said fifth leading zero counter, and said seventh leading zero counter depending upon a word size of words applied to said 36-bit wide bus, said first multiplexer for applying a leading zero count to a plurality of conductors within a first 9 bit positions in a 36-bit wide output bus;

a second multiplexer for receiving a count from said second leading zero counter, said second multiplexer for applying a leading zero count to a plurality of conductors within a second 9 bit positions in said 36-bit wide output bus;

a third multiplexer for receiving a count from said third counter and said sixth counter, said third multiplexer for applying a leading zero count to a plurality of conductors within a third 9 bit positions in said 36-bit wide output bus;

a fourth multiplexer receiving a count from said fourth counter, said fourth multiplexer for applying a leading zero count to a plurality of conductors within a fourth 9 bit positions in said 36-bit wide output bus, said first multiplexer, said second multiplexer, said third multiplexer, and said fourth multiplexer receiving a control signal for identifying which input is to be applied to an output of a respective multiplexer, an output of a respective multiplexer providing a leading zero count of an 8-bit word, a 9-bit word, a 16-bit word, or a 32-bit word on said 36-bit wide input bus; and said 36-bit wide output bus connected to outputs of said first multiplexer, said second multiplexer, said third multiplexer, and said fourth multiplexer.

2. The circuit of claim 1 wherein said sixth leading zero counter and said seventh leading zero counter are combined into a single counter which counts leading zeroes for either said second 16-bit word or said 32-bit word.

3. A circuit for counting leading zeroes in a binary number comprising:

an input bus for carrying one or more words whose leading zero counts are to be determined;

an encoder section containing one or more encoders having inputs electrically connected to conductors on said input bus;

a plurality of leading zero counters connected to outputs of said encoders for determining one or more leading zero counts of one or more words on said input bus, each of said leading zero counters for providing a leading zero count depending upon a size of said one or more words on said input bus; and a plurality of multiplexers connected to outputs of said plurality of leading zero counters, an output of each of said multiplexers being connected to a different group of conductors on an output bus, leading zero counters connected to respective multiplexers providing counts only for application to said conductors on said output bus associated with said respective multiplexers, said multiplexers having one or more control terminals for receiving a signal indicative of a size of words on said input bus.

4. The circuit of claim 3 wherein said input bus comprises:

a 36-bit wide input bus for carrying either a 32-bit word, two 16-bit words, four 9-bit words, or four 8-bit words; and a 32-bit wide bus electrically connected to 32 conductors in said 36-bit wide bus, a four remaining conductors in said 36-bit wide bus for carrying a 9th bit of four 9-bit words on said 36-bit wide bus.

5. The circuit of claim 4 wherein said encoder section comprises:

four 8-bit encoders, each encoder coupled to a different group of 8 conductors on said 32-bit wide bus for outputting an encoded value corresponding to 8 bits on said 8 conductors.

6. The circuit of claim 5 wherein said plurality of leading zero counters comprises:

a first leading zero counter for receiving bits from a first one of said encoders for determining a leading zero count of a first 8 or 9-bit word on said 36-bit wide bus;

a second leading zero counter for receiving bits from a second one of said encoders for determining a leading zero count of a second 8 or 9-bit word on said 36-bit wide bus;

a third leading zero counter for receiving bits from a third one of said encoders for determining a leading zero count of a third 8 or 9-bit word on said 36-bit wide bus;

a fourth leading zero counter for receiving bits from a fourth one of said encoders for determining a leading zero count of a fourth 8 or 9-bit word on said 36-bit wide bus;

a fifth leading zero counter for receiving bits from said first one of said encoders and said second one of said encoders for determining a leading zero count of a first 16-bit word on said 36-bit wide bus;

a sixth leading zero counter for receiving bits from said third one of said encoders and said fourth one of said encoders for determining a leading zero count of a second 16-bit word on said 36-bit wide bus; and a seventh leading zero counter receiving bits from said four 8-bit encoders for determining a leading zero count of a 32-bit word on said 36-bit wide bus.

7. The circuit of claim 6 wherein said plurality of multiplexers comprises:

a first multiplexer for receiving a count from said first leading zero counter, said fifth leading zero counter, and said seventh leading zero counter and for outputting a count from one of said first leading zero counter, said fifth leading zero counter, and said seventh leading zero counter depending upon a word size of words applied to said 36-bit wide bus, said first multiplexer for applying a leading zero count to a plurality of conductors within a first 9 bit positions in a 36-bit wide output bus;

a second multiplexer for receiving a count from said second leading zero counter, said second multiplexer for applying a leading zero count to a plurality of conductors within a second 9 bit positions in said 36-bit wide output bus;

a third multiplexer for receiving a count from said third counter and said sixth counter, said third multiplexer for applying a leading zero count to a plurality of conductors within a third 9 bit positions in said 36-bit wide output bus; and a fourth multiplexer receiving a count from said fourth counter, said fourth multiplexer for applying a leading zero count to a plurality of conductors within a fourth 9 bit positions in said 36-bit wide output bus, said first multiplexer, said second multiplexer, said third multiplexer, and said fourth multiplexer receiving a control signal for identifying which input is to be applied to an output of a respective multiplexer, an output of a respective multiplexer providing a leading zero count of an 8-bit word, a 9-bit word, a 16-bit word, or a 32-bit word on said 36-bit wide input bus.

* * * * *